US010373097B2

(12) United States Patent
Kulkarni et al.

(10) Patent No.: US 10,373,097 B2
(45) Date of Patent: Aug. 6, 2019

(54) AUTONOMOUS MULTIMODAL LOGISTICS

(71) Applicant: Staples, Inc., Framingham, MA (US)

(72) Inventors: Girish Kulkarni, Cambridge, MA (US); Michael Bhaskaran, Seattle, WA (US); Vikranth Gopalakrishnan, South Grafton, MA (US)

(73) Assignee: Staples, Inc., Framingham, MA (US)

( * ) Notice: Subject to any disclaimer, the term of this patent is extended or adjusted under 35 U.S.C. 154(b) by 0 days.

(21) Appl. No.: 15/814,564

(22) Filed: Nov. 16, 2017

(65) Prior Publication Data

US 2018/0137454 A1 May 17, 2018

Related U.S. Application Data

(60) Provisional application No. 62/422,594, filed on Nov. 16, 2016.

(51) Int. Cl.
| | |
|---|---|
| *G05D 1/10* | (2006.01) |
| *G06Q 10/08* | (2012.01) |
| *B64C 39/02* | (2006.01) |
| *B64D 1/02* | (2006.01) |
| *G05D 1/02* | (2006.01) |
| *G08G 5/00* | (2006.01) |
| *G05D 1/00* | (2006.01) |

(52) U.S. Cl.
CPC ......... *G06Q 10/083* (2013.01); *B64C 39/024* (2013.01); *B64D 1/02* (2013.01); *G05D 1/0027* (2013.01); *G05D 1/021* (2013.01); *G05D 1/0212* (2013.01); *G05D 1/101* (2013.01); *G08G 5/0069* (2013.01); *B64C 2201/128* (2013.01); *B64C 2201/146* (2013.01)

(58) Field of Classification Search
CPC ................ G06Q 10/083; B64C 39/024; B64C 2201/128; B64C 2201/146; B64D 1/02; G05D 1/021; G08G 5/0069
USPC ........................................................... 701/2
See application file for complete search history.

(56) References Cited

U.S. PATENT DOCUMENTS

| 9,527,605 B1 * | 12/2016 | Gentry ...................... B64F 1/12 |
| 9,959,771 B1 * | 5/2018 | Carlson ................ G08G 5/0039 |
| 2016/0196756 A1 * | 7/2016 | Prakash ................ B64C 39/024 |
| | | 701/3 |
| 2016/0253908 A1 * | 9/2016 | Chambers ............. B64C 39/024 |
| | | 701/2 |

(Continued)

*Primary Examiner* — Gertrude Arthur Jeanglaude
(74) *Attorney, Agent, or Firm* — Patent Law Works LLP

(57) ABSTRACT

An example system may comprise a docking station remotely located from a fulfillment center, a fulfillment system, an unmanned aerial vehicle (UAV), and an autonomous ground vehicle (AGV). The fulfillment system manages the fulfillment center and the docking station, receives a request to ship an item, determines an item transfer point based on a delivery point, and calculates a flight path to the item transfer point. The fulfillment system loads the item at the fulfillment center via a handling mechanism of the UAV and deploys the UAV to the item transfer point using the flight path. The AGV is coupled for wireless communication with the fulfillment system, the docking station, and the AGV. The item transfer point indicates a geographical location where the item is to be transferred from the UAV to one of the docking station and the AGV based on the delivery point.

19 Claims, 10 Drawing Sheets

(56) References Cited

U.S. PATENT DOCUMENTS

2017/0313421 A1* 11/2017 Gil .......................... B64D 1/00
2018/0095464 A1* 4/2018 Takayama ............ G05D 1/0038

* cited by examiner

AUTONOMOUS MULTIMODAL LOGISTICS

CROSS-REFERENCE TO RELATED APPLICATIONS

This application claims the benefit under 35 U.S.C. § 119(e) of U.S. Provisional Patent Application No. 62/422,594, entitled "Autonomous Multimodal Logistics" and filed Nov. 16, 2016, which is incorporated herein by reference in its entirety.

TECHNICAL FIELD

The present disclosure relates to fulfillment systems, and more particularly to item delivery.

BACKGROUND

Order fulfillment is the process from point of sales inquiry to delivery of a product to the customer. With the advent of ecommerce, many sales have moved online, and as a result, the nature of order fulfillment has generally moved from a more top-down distribution network oriented approach to direct-to-consumer logistics. Traditional distribution networks have generally moved product from manufacturers to local retail establishments through centralized distribution hubs. While some aspect of ecommerce certainly employ distribution networks as part of order fulfillment, direct-to-consumer logistics and parcel delivery is playing an increasingly significant role in the modern economy.

Regulation and commercial use of unmanned aerial vehicles (UAV) (also referred to as drones in some cases) is at the forefront of future order fulfillment. Safety issues such as flight controller distractions, aircraft collisions, as well as privacy and insurance issues are a few of the issues that need to be addressed for wider commercial use of UAVs. While some issues may be remedied through purely regulatory means, other obstacles to commercial adoption of UAVs will be overcome based on technical advances that match UAV technology to real-world societal needs.

SUMMARY

According to one innovative aspect of the subject matter being described in this disclosure, methods may include receiving a request to ship an item; loading the item via a handling mechanism of an unmanned aerial vehicle (UAV); determining an item transfer point based on a delivery point, the item transfer point indicating a geographical location where the item is to be transferred from the UAV to one of a docking station and an autonomous ground vehicle (AGV) based on the delivery point; calculating a flight path to the item transfer point; deploying the UAV to the item transfer point using the flight path; and transferring the item from the UAV to one of the docking station and the AGV.

According to another innovative aspect of the subject matter in this disclosure, systems may include: a docking station remotely located from a fulfillment center; a fulfillment system that manages the fulfillment center and the docking station, receives a request to ship an item, determines an item transfer point based on a delivery point, and calculates a flight path to the item transfer point; a UAV coupled for wireless communication with the fulfillment system and the docking station; and an AGV coupled for wireless communication with the fulfillment system, the docking station, and the AGV. The item transfer point indicates a geographical location where the item is to be transferred from the UAV to one of the docking station and the AGV based on the delivery point. The fulfillment system loads the item at the fulfillment center via a handling mechanism of the UAV and deploys the UAV to the item transfer point using the flight path.

These and other implementations may optionally include additional or alternative features, such as but not limited to: that transferring the item to one of the docking station and the AGV based on the delivery point includes: selecting the AGV from a group of AGVs associated with the item transfer point based on one or more of: one or more item properties, one or more UAV attributes, one or more AGV attributes, and one or more delivery point characteristics; coordinating a handoff of the item between the selected AGV and the UAV; transferring the item to a handling mechanism of the AGV using the handling mechanism of the UAV; calculating a route for the AGV from the item transfer point to the delivery point; navigating the AGV from the item transfer point to the delivery point; unloading the item from the AGV at the delivery point; that selecting the AGV from the group of AGVs includes selecting the AGV based on an available payload capacity corresponding to one or more of a dimension and weight of the item, and an available deployment time corresponding to a targeted delivery time for delivering the item to the delivery point; that selecting the AGV from the group of AGVs further includes matching a characteristic of the delivery point to a mechanical delivery capability of the AGV; initially determining to transfer the item from the UAV to the AGV based on the delivery point; receiving, during transit of the item by the UAV to the delivery point, a signal requesting a change to the delivery point; determining to transfer the item from the UAV to the docking station instead of the AGV based on the change to the delivery point; determining to transit the item to an alternative delivery point corresponding to the change using the AGV; that transferring the item to one of the docking station and the AGV based on the delivery point includes: determining to transfer the item from the UAV to a handling system of the docking station based on the delivery point, coordinating a handoff of the item between a port of the handling system of the docking station and the UAV, and transferring the item through the port of the docking station using the handling mechanism of the UAV; that the item is transferred to the docking station; holding the item in a locker associated with the docking station for pickup by a retriever; displaying, on a display of a display device coupled via a computer network to a fulfillment system, a graphical user interface comprising management dashboard, the graphical user interface including a map region for viewing the UAV, the docking station, and the AGV; that the graphical user interface further includes graphical elements embodying controls for one or more of: switching a display of the map region between a two-dimensional map and three dimensional map, viewing all or select UAVs, docking stations, and AGVs associated with the fulfillment system, viewing all or select item transfer points between deployed UAVs, available docking stations, and available AGVs, viewing all or select delivery statuses of items being managed by the fulfillment system, modifying the flight path of the UAV, changing the delivery point to an alternative delivery point, changing the docking station to an alternative docking station, specifying a particular AGV to use for a particular item delivery, and managing a group of AGVs associated with a particular docking station; displaying, on a display of a display device, a graphical user interface requesting input providing a delivery point confirmation; receiving the input at a guidance engine; and determining, by the guidance engine, to change the delivery point based on the delivery point confirmation; that the fulfillment system selects the AGV from a group of AGVs associated with the item transfer point based on one or more of: one or more item properties, one or more UAV attributes, one or more AGV attributes, and one or more delivery point characteristics, and coordinates a handoff of the item between the selected AGV and the UAV; that the fulfillment system further calculates a route for the AGV from the item transfer point to the delivery point; that the AGV navigates from the item transfer point to the delivery point and unloads the item at the delivery point; that the fulfillment system selects the AGV from the group of AGVs based on an available payload capacity corresponding to one or more of a dimension and weight of the item, and an available deployment time corresponding to a targeted delivery time for delivering the item to the delivery point; that the fulfillment system initially determines to transfer the item from the UAV to the AGV based on the delivery point, and receives, during transit of the item by the UAV to the delivery point, a signal requesting a change to the delivery point; that the fulfillment system determines to transfer the item from the UAV to the docking station instead of the AGV based on the change to the delivery point; that the fulfillment system determines to transit the item to an alternative delivery point corresponding to the change using the AGV; that the docking station includes a handling system having a port; that the fulfillment system determines to transfer the item from the UAV to a handling system of the docking station based on the delivery point, coordinates a handoff of the item between the port of the handling system of the docking station and the UAV; and that the handling mechanism transfers the item via the port of the handling system of the docking station.

Other innovative aspects include corresponding systems, methods, apparatus, and computer program products.

These systems, methods, apparatus, computer program products, and other aspects, are particularly advantageous in a number of respects. For example, the technology may lower labor and other overhead costs currently present in fulfillment systems. The technology may lower the risk of equipment and item damage, including total drone loss due to theft or damage, drone damage, physical harm to customers or third-party physical assets, etc. The technology may further improve parcel delivery coverage, particularly around restricted airspace such as airports or governmental facilities; may lower energy consumption in order fulfillment; may increase the speed with which order fulfillment is completed; and may prevent item theft. However, this list of features and advantages is not all-inclusive and many additional features and advantages are within the scope of the present disclosure. Moreover, it should be noted that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
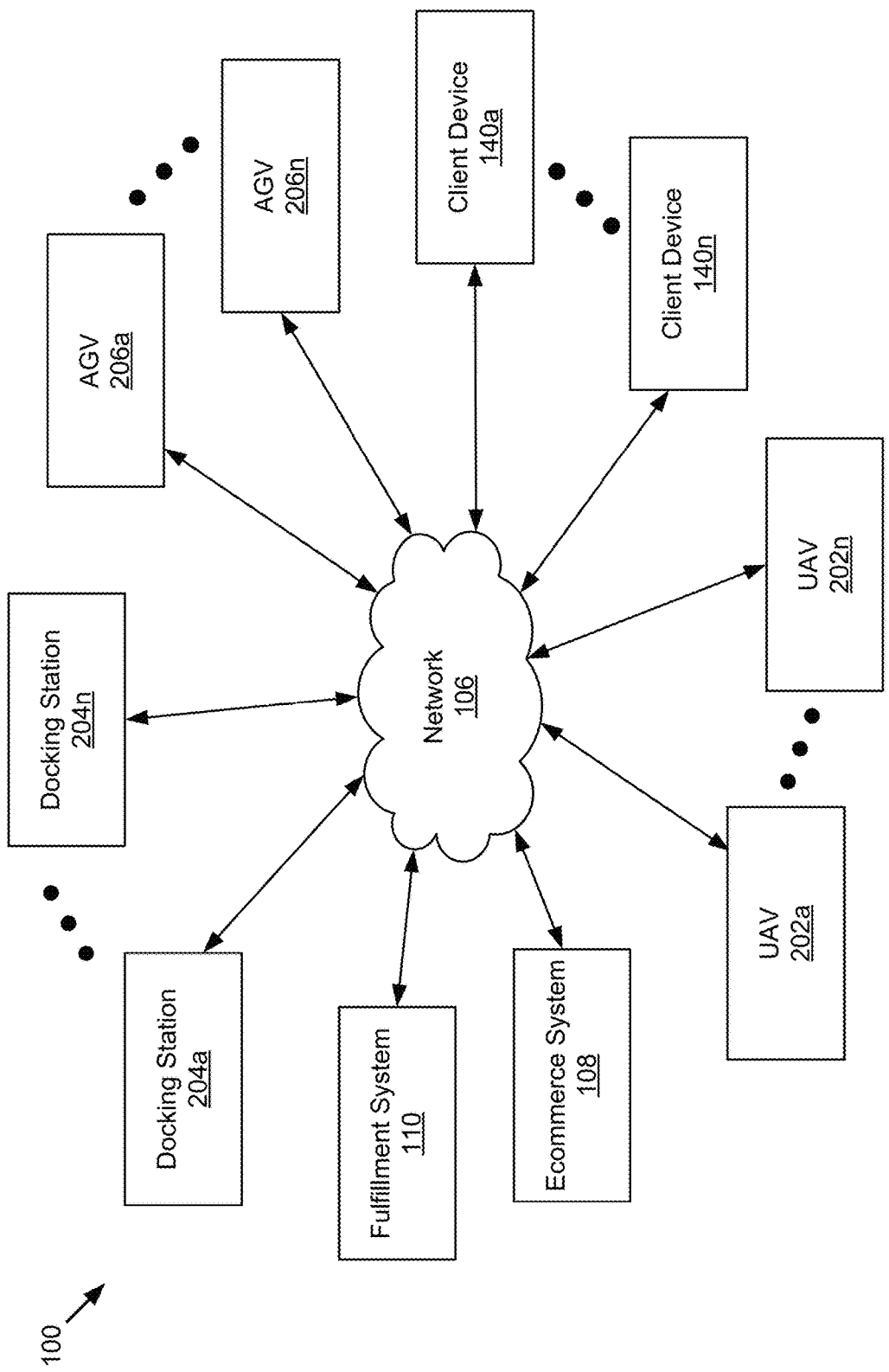
FIG. 1 is a block diagram illustrating an example ordering and fulfillment system 100.

FIG. 1 is a block diagram illustrating an example ordering and fulfillment system 100. As shown, a system 100 may include a plurality of docking stations 204a . . . 204n (also referred to herein individually or collectively as 120), a plurality of AGVs 206a . . . 206n, a plurality of client devices 140a . . . 140n, a plurality of UAVs 202a . . . 202n, a fulfillment system 110, and an e-commerce system 108, although it should be understood that any number of the components 204, 206, 140, 202, 110, and 108 may be included in the system depending on the need and the configuration of that system 100.

Often, a user 102 places an online order through interacting with an electronic device, such as a client device 140. For example, the client device 140 may be a computer, tablet, smart phone, or other device that can interact with an ecommerce system 108 over a computer network 106. In one particular example, the network 106 may be the publically accessible Internet operating with the Internet Protocol (IP) version 4 (IPv4) or version 6 (IPv6), although other networks or combination of networks are also applicable.

Connections between the components 108, 110, 140, 202, 204, 206, etc., may be made via direct data connections and/or the computer network 106, depending on the configuration. The computer network 106 may comprise any number of networks and/or types of networks, such as wide area networks, local area networks, virtual private networks, cellular networks, close or micro proximity networks (e.g., Bluetooth, NFC, etc.), etc. In some embodiments, one or more of these components may be coupled via a data communications bus. Further, it should be understood that orders may be placed in-store via a point of sale system, via phone to a call center, or via other suitable mechanism, all of which are encompassed by the ecommerce system block 108.

Placement of an order is generally done over a securely encrypted transport stream between the electronic device 104 and the 108 to prevent unauthorized access, hacking, etc., although insecure transport streams may be applicable in certain cases. Once the order is placed, the ecommerce system 108 may update inventory records, process payment, and dispatch fulfillment of the order to the fulfillment system 110. In some cases, the fulfillment system 110 and the ecommerce system 108 may be managed by a common entity such as a site owner. In some cased, the fulfillment system 110 and the ecommerce system 108 may be hosted from a common set of hardware, such as a server. In other cases, a separate entity may manage the fulfillment system 110, and an interface between the fulfillment system 110 and the ecommerce system may be more pronounced. Regardless, communication from the ecommerce system 108 to the fulfillment system 110 may be passed through the network 106, and generally may include information such as items in the order, delivery point, fulfillment speeds, and so forth.

Additional communication between the ecommerce system 108 and the fulfillment system 110 may be passed through the network 106 as fulfillment of the order progresses. For example, estimated order fulfillment time, order cancellation requests, order return requests, and other information pertinent to fulfillment of the order may be passed between the ecommerce system 108 and the fulfillment system 110.

The system 100 components 108, 110, 140, 202, 204, 206, etc., are discussed in further detail herein.

Figure 2:
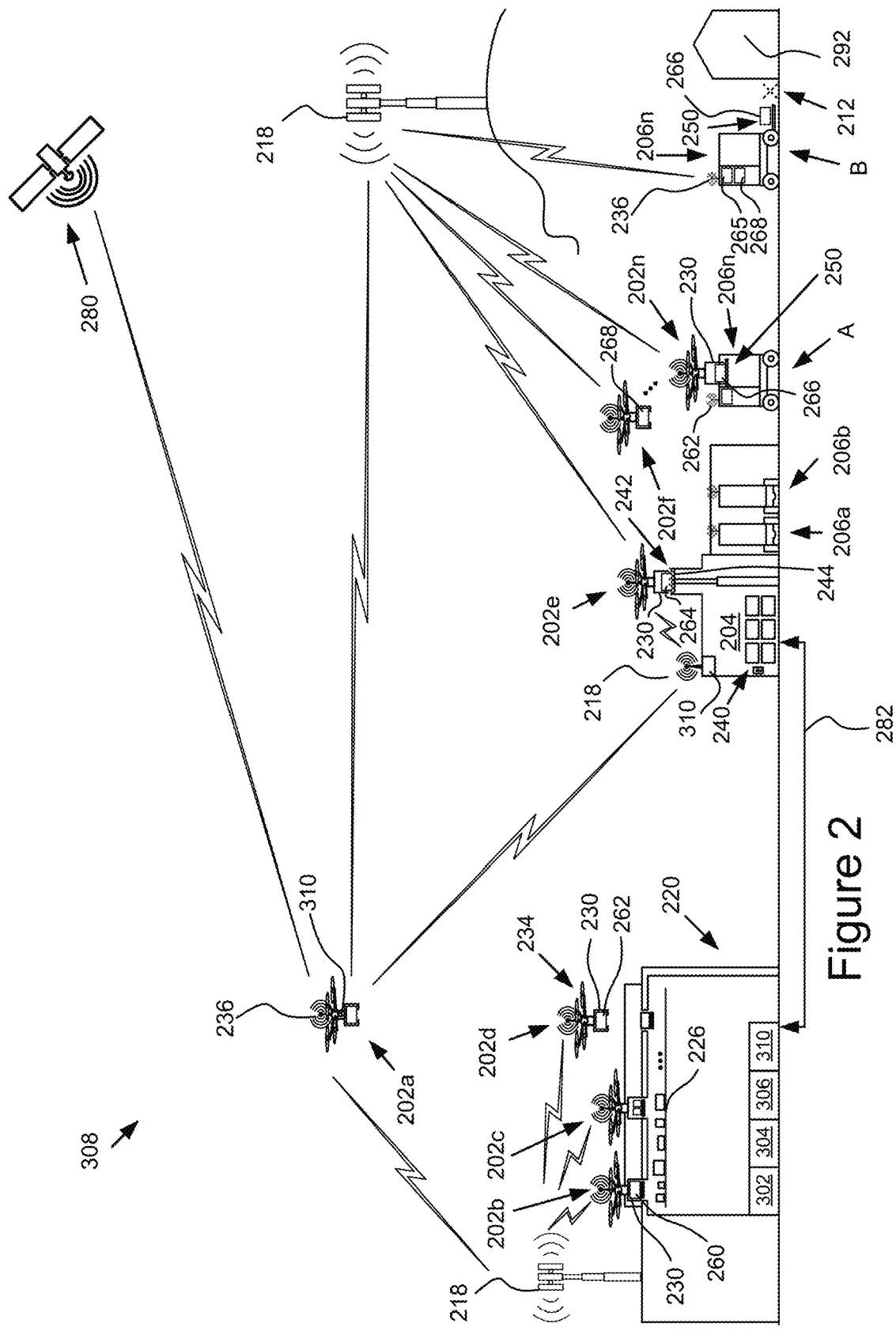
FIG. 2 is a block diagram illustrating an example item shipping system.

FIG. 2 is a block diagram illustrating an example item shipping system 308. The shipping system 308 manages the delivery of items from fulfillment center(s) 220 to various delivery points 212. Innovatively, the shipping system 308 can provide a multimodal platform in which items are transited autonomously using different modes of unmanned transportation. For example, in the system 308, UAVs 202 can transit items through the air more directly to their approximate destinations and then transfer the items to AGVs 206 for delivery to their precise estimations.

Delivery using the multimodal approach described herein can advantageously provide for a shorter and more quickly navigated transit path relative to current solutions that use the single mode transit from a dispatch or fulfillment center to a delivery point., as the UAV 202 may traverse a substantially straight flight path between a dispatch point and the item transfer point, while a conventional ground delivery vehicle is typically required to indirectly navigate through surface streets from the dispatch point to the item transfer point or delivery while stopping at stop lights, yielding to traffic, taking indirect routes, adhering to lower speed limits, etc. Additional details regarding various multimodal aspects of the shipping system 308 are discussed further elsewhere herein.

Also, as discussed in detail elsewhere herein, the shipping system 308 provides a recipient the ability to dynamically change a delivery point even after an item is in transit. This advantageously allows the recipient to specify whether to pick up a package from a docking station 204, have the package delivered to an alternative location, delay delivery of the package to a particular timeframe, etc.

As shown in FIG. 2, an example shipping system 308 may include a plurality of UAVs 202*a*, 202*b*, 202*c*, 202*d*, 202*f* . . . 202*n* (also referred to herein individually or collectively as simply 202), and a plurality of autonomous ground vehicles (AGVs) 206*a*, 206*b*, . . . 206*n* (also referred to herein individually or collectively as simply 206). The shipping system 308 may further include one or more docking stations 204 and one or more fulfillment centers 220.

The system 308 may utilize a communication infrastructure including wired and/or wireless communication channels that communicatively connect the UAV(s) 202, the AGV(s) 206, the docking station(s) 204, and fulfillment centers 220. The communication infrastructure may include any suitable components for facilitating wired or wireless communication between system 308 elements, as well as the self-positioning and geolocation of various elements, as UAV(s) 202 and AGV(s) 206.

The shipping system 308 may include various base station(s) 218, such cellular radio towers, access points, or other wireless communication components that wirelessly connect the UAV(s) 202 and AGV(s) 206 to one another and/or to other components of the system 308 for communication, such as the fulfillment center(s) 220, and the docking station(s) 204. While three example base stations 218 are depicted (e.g., cellular radio towers, access points, etc.), it should be understand that the system 308 may include a wireless communication network having any suitable number of base stations, which may take the same or different forms (e.g., towers, UAVs, satellites, ground vehicles, internet access points, etc.).

By way of example and not limitation, the UAV 202*a* is depicted as being capable of communicating with various different components of the system 308 via the network 106. As shown, the UAVs 202 may include any requisite communication devices, such as network transceivers, positioning system transceivers, etc., as represented by 236, to enable the UAVs 202 remain in communication with other components of the system 110, such as the fulfillment application 310, other UAVs 202, AGV's 206, docking stations 204, the fulfillment centers 220, etc.

More particularly, the UAV 202*a* may receive a global positioning signal from the satellite 280, may exchange IP packets with various other nodes on the network 106, such as a cell tower 218 associated with the fulfillment center 220, a cell tower 218 located on a nearby hill, an access point 218 located at the docking station 204, peer nodes embodied by other UAVs 202 and/or AGVs 206, a satellite, etc. This advantageously allows the UAVs 206 to reliably communicate with the fulfillment application 310 to provide position information, receive updated delivery information, receive alerts, and so forth.

The communication infrastructure may in some cases include a one or more backhaul links 282. A backhaul link 282 may be implemented with various wired or wireless technology, including but not limited to, fiber optic cables and microwave links. The backhaul link 282 may communicatively couple the various components of the system 308 to facilitate communication with less latency than what might be available over a convention network, such as a cellular network. Further, the backhaul link 282 may generally may communicatively couple components to a public network such as the Internet. In some implementations, the UAVs 202 may communicate with one another, and other components of the system 308 (e.g., the fulfillment application 258 of the fulfillment center 220) using a mesh network, which allows the UAVs 202 to stay in communication in remote areas.

The system 308 may utilize a position determination system for determining the geographic locations of the UAV(s) 202 and AGV(s) 206. The position determination system 280 can provide positioning signals to electronic devices configured to receive the signals, such as the UAV(s) 202 and AGV(s) 206. The position determination system 280 may provide the positioning signals via wireless transmitters and receivers, or via other suitable transmission mechanisms. The UAV(s) 202 and AGV(s) 206 may include interfaces (e.g., transceivers, network interfaces, etc.) that receive positioning signals from the position determination system 280, which the UAV(s) 202 and AGV(s) 206 may process to determine their respective geographic locations. The positioning determination system 280 may all provide accurate time signals to the UAV(s) 202 and AGV(s) 206 so they can synchronize their clocks and execute instructions at the appropriate times.

While a satellite-based system is depicted in FIG. 2, a position determination system 280 could include any suitable system, such as satellite or terrestrial-based systems, or a combination of the foregoing. Non-limiting examples include a global positioning system (GPS), a differential global positioning system (DGPS), an assisted global positioning system (A-GPS), etc., a telecommunications system including a multilateration or triangulation engine (e.g., providing a position triangulated using cell tower signals), a geolocation system capable of determining an approximate geolocation using an IP address of a UAV 202 or AGV 206 on the network 106 by cross-referencing the IP address with other information sources, such as internet server provider databases, internet registries, etc., or other location systems and/or mechanisms. Other suitable variations are also possible and contemplated.

In the example depicted in FIG. 2, items are shipped from the fulfillment center 220 various delivery points 212 of the system, and/or items are shipped from delivery points to the fulfillment center and/or other delivery points. The fulfillment center 220 is managed by the fulfillment system 110, which may include a warehouse system 302, a package system 304, a pick system 306, and a shipping system 308. Various aspects of the warehouse system 302, the package system 304, the pick system 306, and the shipping system 308 may be controlled and managed by a fulfillment application 310.

Figure 3B:
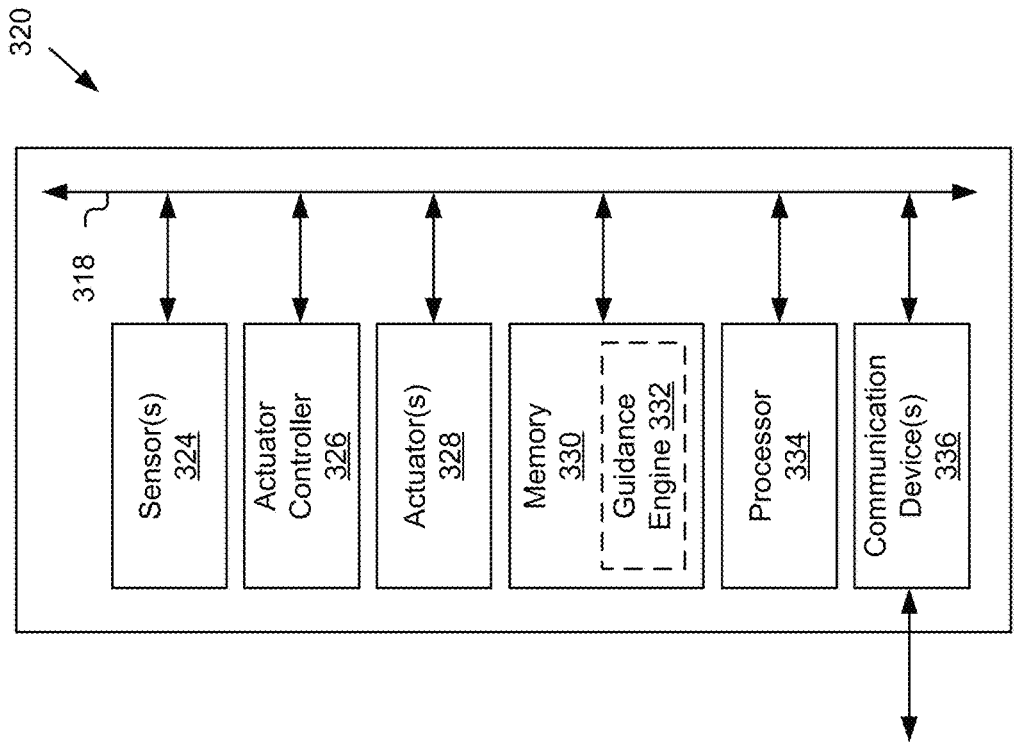
FIG. 3B is a block diagram of an example vehicle.
Figure 3A:
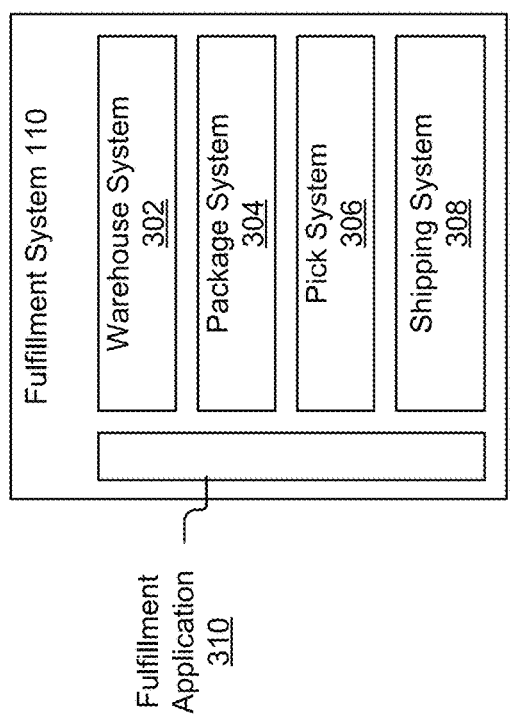
FIG. 3A is a block diagram illustrating an example fulfillment system.

FIG. 3A is a block diagram illustrating such an example fulfillment system 110. The warehouse system 202, the package system 204, the pick system 206, and the shipping system 208, and/or components thereof, may be managed and/or controlled by the fulfillment application 310, which may be a centralized or distributed application comprises of one or more instances including the same or varying degrees of functionality. The warehouse system 202, the package system 204, the pick system 206, and the shipping system 208, and/or their various constituent components thereof, may be communicatively coupled through one or more various networks and may be further communicatively coupled, either directly or indirectly, to the ecommerce system 108 through the network 106 as previously described with reference to FIG. 1. It should be understood that while the fulfillment process may include some manual aspects, the fulfillment system 110 may include various components for automating the fulfillment process.

The warehouse system 202, may include software, electronic, and mechanical components configured to receive and store goods in a space and time efficient manner. The warehouse system 202 may include autonomous forklifts, cranes, robots, conveyer belts, and other electromechanical devices to move goods from loading docks to shelfs and bins within a building. Additionally, the warehouse system 202 may include electronic devices to scan radio frequency identifiers (RFIDs), and product imaging devices such as barcode scanners or machine vision product recognition devices. Inventory tracking software, which records where items are placed and how many units of a given item are at a particular location, may also be included in the warehouse system and interacted with by the fulfillment application 310, or may be included as part of the fulfillment application. The warehouse system 202 and/or the fulfillment application 310 may also include an automated ordering system that notifies and/or may directly place orders to specific manufacturers, wholesalers, and/or merchants, when threshold levels of a particular type of good is reached.

The package system 204 may include software, electronic, and mechanical components configured to appropriately package one or more items in a shipping container. For example, a packaging robot may include machine vision capabilities to determine the approximate size of an item. A scale or inventory information may provide other properties, such as the approximate weight of the item and the tensile strength of the item. The package system 204 may itemize and categorize different size shipping containers by size, shape, weight capacity, weather durability, etc., and may select an appropriate shipping container based on the properties of the item as determined by the package system 204. The package system 204 may also include various packing materials such as an expanded polystyrene molding device, a foam peanut dispenser, bubble wrapper, tape dispenser, and other types of packaging devices. Like with the other fulfillment system 110 components, the fulfillment application 310 may interface with package system layer software to control the software, electronic, and mechanical components of the package system 304 or provide instructions of the package system 304 for it to control such. In further embodiments, the package system layer software may be integrated with the fulfillment application.

The pick system 206 may include software, electronic, and mechanical components configured to retrieve goods stored within the building by the warehouse in a space and time efficient manner. Additionally, the pick system 206 may include electronic devices to scan RFIDs or otherwise recognize products aside from specified placement in bins and shelfs. The pick system 206 may include autonomous forklifts, cranes, robots, conveyer belts, and other electromechanical devices to move goods from shelfs and bins within a building to a packing location for packaging with the package system 204. The pick system 206 may interface with the warehouse system 202 to decrement inventory when an item has been removed from a bin or shelf. The pick system 206 may also be indirectly or directly interfaced with the ecommerce system 108 with triggers that are activated when an order is received by the ecommerce system 108. In some cases, the fulfillment application 310 may provide the software interfaces for the above components, and in further cases the fulfillment application 310 may send and receive requisite data from the ecommerce system 108, warehouse system software, pick system software, etc.

For example, when an order for a widget is placed with the ecommerce system 108, the ecommerce system 108 may send a request to the fulfillment system 110 to fulfill the order for the widget. The fulfillment application 310 may receive the request and signal the pick system 206 (e.g., via a pick system control layer) to have the item/widget picked. In response, the pick system 206, in particular, may check the inventory of widgets through communicating with the warehouse system and request a bin and/or shelf location where a widget can be located. The pick system 206 may then dispatch autonomous forklifts, cranes, robots, conveyer belts, and other electromechanical devices to move the widget to the packing location for processing by package system 204. Additionally or alternatively, the pick system may signal a UAV to pick the item(s) directly from certain inventory locations (e.g., which may be suitable for shipping or prepackaged, or in some cases, packaged on the UAV using the item handling mechanism, etc.).

The shipping system 208 may include software, electronic, and mechanical components configured to provide logistics in delivering the package to a delivery point specified in an order, as discussed in further detail elsewhere herein.

The fulfillment application 310 includes logic executable by a processor to manage the various fulfillment system 110 components, including the UAV(s) 202, the docking station(s) 204, the AGV(s) 206, and the components of the fulfillment center(s) 220. In some embodiments, the fulfillment application 310 receives external requests, such as fulfillment request from an e-commerce system 108, processes the requests, and signals the various components of the fulfillment system 110 to perform their functionalities in the proper order such that the items associated with the fulfillment requests are properly retrieved and loaded on UAVs 202 for delivery. Further, the fulfillment application 310 comprises logic for dispatching and/or guiding the UAVs 202 to their transfer points, coordinating the transfer of the items to their respective receivers, whether they be docking stations 204, AGVs 206, or otherwise. Additional acts, structure, and functionality of the warehouse system 202, the package system 204, the pick system 206, and the shipping system 208, and fulfillment application 310 are described in further detail elsewhere herein.

Turning again to FIG. 2, UAV 202d has completed the loading process and taken off with the loaded item 262. As shown, the handling mechanism 230, which is attached in this example on a lower side of the main body 234 of the UAV 202d, such that the UAV 202d may conveniently land and transfer its item(s) to a receiver. As shown, the main body 234 of UAV 202d may include the propulsion units (e.g., motors and propellers in this case) any the electronic and mechanical components necessary for the UAV to function properly.

As shown, UAV 202d is securely retaining the package 262 while in transit. In this example, UAV 202d is in the process of navigating its flight path to its transfer point, where it, for instance, will transfer the item 262 to an available AGV 206 for delivery to the item's delivery point.

In FIG. 2, an example fulfillment center 220 is depicted. As shown, the UAVs 202 may be loaded with items at the fulfillment center 220 and deployed in the field to transfer their items to a designated receiver. For example, as shown, UAV 202b is docked with the fulfillment center 220 and is being been loaded with item 260. The handling mechanism 230 of UAV 202b is about to secure the item 260 in preparation for deployment. Similarly, UAV 202c is docked with the fulfillment center 220 and is been loaded with a plurality of items. As shown, in some embodiments, once the pick system 306 is used to pick the products and the package system 304 is used to package the products in cartons, the package system 304 or shipping system 308, as the case may be, may be used to convey 226 the prepared items (e.g. cartons) to the proper location for loading onto the UAVs 202. In some further embodiments, the items may be loaded manually or semi-manually onto the UAVs. Other suitable variations are also possible and contemplated.

A designated receiver may comprise a docking station 204, in which case the transfer point coincides with a geographic location at the docking station 204. At the transfer point, a UAV 202 may unload a given item from its payload area. For example, the UAV 202 may land at the transfer point, and release the item via its handling mechanism (e.g., an attachment mechanism) to unload the item from the payload area. In a more particular non-limiting example, item(s) from a UAV 202 may be transferred at a receiving port at the docking station 204, such as port 242. The docking station 204 may include a handling system 244 that is capable of receiving one or more items from a docked UAV 202, such as UAV 202e depicted in FIG. 2, which is shown as docked to the port 242 and in the process of transferring item 264 via a port 242 to the handling system 244. The handling system 244 may comprise any suitable manual and/or automatic components for unloading and/or receiving and/or conveying and/or storing items provided to it by the UAVs 202.

In some embodiments, the handling system 244 may be automated. The fulfillment system 110 may automatically coordinate the docking of the UAV 202e to the port 242 of the docking station 204, automatically initiate the transfer of the item(s) to be transferred from the handling mechanism 230 of the UAV 202e to the handling system 244 of the docking station 204, and then automatically convey the transferred item(s) corresponding storage location(s). The fulfillment system 110 may automatically identify the item(s) using unique identifying information accompanying the item(s), such as tag information stored in the tag included on each item (e.g., RFID, barcode, QR code, etc.).

As a further example, the UAV 202e may signal its identity to the docking station 204 via a communication channel. In some embodiments, the UAV 202e may include a radiofrequency transmitter that transmits a unique identifier that is received by a corresponding receiver at the docking station 204, and the fulfillment system 110 may process the identifier and determine the identity of the UAV 202e and the contents of its cargo, such as the items that it is carrying. In some embodiments, UAV 202e sends a wireless signal (e.g., via Bluetooth®, Wi-Fi™, NFC, etc.) that includes the unique identifier of the UAV 202e and/or the unique identifier(s) of the item(s) to be transferred (e.g., item 264). In some embodiments, the fulfillment system 110 may retrieve the identifiers of the items from a data store (e.g., data store 372 in FIG. 3C) based on the unique identifier of the UAV 202e, and in some cases, the unique identifier of the docking station 204. Numerous other suitable variations are also possible and contemplated.

In response to identifying the specific item(s), the fulfillment system 110 may execute the transfer of the item(s) to the docking station 204, convey them to identifiable storage location(s), and uniquely associate the item(s) with those storage location(s) so they can be retrieved/delivered later. In some embodiments, the UAV 202e may drop the items at the port 242, and manual handling may be used to scan the items and store them in their respective storage locations.

In some cases, the docking station 204 may act as a waypoint where multiple UAV 202 delivered packages are queued up and loaded onto the AGV 206. In some further cases, the docking station 204 may be a package station located at a convenient location in a neighborhood or area near the delivery point.

In some embodiments, the docketing station 204 may act as a loading system that relays items received from UAVs 202 to AGVs 206. For example, at the transfer point, item 264 could be transferred by the handling system 244 to the AGV 206a or 206b. For instance, an elevator/lift may transit the item 264 from the top of the building to the AGV 206a waiting below, or an elevator may transit an AGV 206 to the top of the docking station 204 to retrieve the item. Other variations are also possible and contemplated.

In further embodiments, a designated receiver may comprise an AGV 206, in which case the UAV 202 may directly dock with the AGV 206 or proximate thereto and transfer one or more packages to the AGV 206 for delivery.

As shown, one or more AGV 206 may be associated with a given docking station, such as the docking station 204. The fulfillment system 110 may select a particular AGV 206 as a designated receiver for receiving and item from a particular UAV 202. In some embodiments, the fulfillment system 110 may determine an item transfer point where one or more items are to be transferred from the UAV 202 to the selected AGV 206. The transfer point may coincide with the selected AGV 206's current position, or may be a location different from the selected AGV 206's current position. If different, the selected AGV 206 may be instructed to navigate to the transfer point and rendezvous with the UAV 202. In some embodiments, an item transfer point may be determined or predetermined after the shipping request has been received.

By way of further illustration, as shown in FIG. 2, UAVs 202f and 202n have both been instructed by the fulfillment system 110 to transfer their items to AGV 206n. As depicted, the handling mechanism 230 of the UAV 202 is currently in the process of transferring its item 266 to a handling mechanism 250 of the AGV 206n. In some embodiments, the AGV 206n is capable of receiving a plurality of items, and temporarily keeping track of and storing the items during transit. Further, the AGV 206n is capable of retrieving a given item or items from temporary storage for delivery at the proper delivery point 212. As such, the AGV 206n can receive and store item 266 from UAV 202n and receive and store item 268 from UAV 202n. In some embodiments, items may be received at the same time or sequentially depending on the configuration and receiving capacity of the AGV 206.

To further illustrate, the following non-limiting example is provided. The UAV 206n is shown in two different positions in FIG. 2, namely position A and position B. Position A corresponds with the transfer point at which the AGV 206n receives items 266 and 268 from the UAVs 202g and 202n, respectively. Responsive to receiving and securing the items 266 and 268, the AGV 206n transits the items 266 and 268, along with item 265 which it previously had received and retained, to the delivery point 212. Upon reaching the delivery point 212, the AGV 206n, which is now in position B, retrieve the item to be delivered at the delivery point 212, which in this example is item 266 from temporary storage using its handling mechanism 250. In this non-limiting example, the handling mechanism 250 may include an item lifting, gripping, and/or carrying mechanism that is capable of moving in the Z, X, and Y axis, and includes the requisite gears, pulleys, hydraulics, and/or other mechanical and/or electrical components for actuating and/or controlling the components of the handling mechanism 250. Numerous other variations for the handling mechanism 250 are also possible and contemplated.

Further detail regarding transferring item(s) from a UAV 202 and/or an AGV 206 is provided elsewhere herein.

The delivery point 212 is depicted in FIG. 2 to further understanding of the various aspects of the shipping system 308. In an example, the delivery point 212 may be associated with a residence in which a user resides, a place of business where the user works, or otherwise. For instance, the user may have placed an order for the item 290 that is being fulfilled in FIG. 2. The delivery point 212 may be a driveway, porch, a bin, mailbox, locker, port, entrance, room, or other point adjacent to or in a structure. In some example cases, the delivery point 212 may be near the structure 292 but not necessarily adjacent, or may be unassociated with a structure or comprise the structure itself. Other examples include near or inside a place of business, organization, government agency, pickup kiosk, etc. In some examples, the delivery point 212 might be a docking station 204.

In some cases, the delivery point 212 may include a locker that is either manual or is capable of automatic storage and retrieval. In other cases, an AGV 206 may convert into a temporary locker by enclosing the package, parking at a delivery point, and communicating an access code to the recipient through the fulfillment system 110. Once the package has been retrieved by the recipient, the AGV 206 may transition from its role as a locker and resume its role as an AGV. In some embodiments, the transfer point may be located on an airship, a truck (e.g., embodying a docking station 204) having several AGVs 206 logistically associated with the truck, a building, a tower, or other structure that is relatively free of hazardous interference from people.

While in the depicted example, a single delivery point 212 is depicted, it should be understood that in a typical implementation, a multiplicity of delivery points could be efficiently serviced by a multiplicity of UAVs 202 and AGV(s) 206, which are coordinated by the fulfillment system 110. Additionally, the delivery point 212, as discussed further below, may change during the delivery of a package based user input, delivery infrastructure availability, package properties, etc. Further, an AGV 206 may be transferred by various UAVs 202 and/or transfer items to UAVs 202 along its route, which may be fixed or dynamic as items are designated for delivery by the AGV 206 and/or picked up for shipment by the AGV 206

As discussed elsewhere herein, the UAV 202 may include wireless communication device(s) 236 that are used to connect to the wireless communication network through wireless link(s), through which the UAV 202 may communicate with other network nodes, such as other UAVs 202, docking stations 204, the fulfillment system 110, AGVs 206, etc. In some embodiments, the UAV 202 may have a wired communication port, also represented by 236, and may download requisite information prior to beginning or during delivery of an item (e.g., at a dispatch facility, remote docking stations 204, etc.).

Through the communication device(s) 236, geographic coordinates for the docking station 204 and/or the delivery point 212, and/or navigation routes may be communicated to the UAV 202. Mapping data, including flight restricted areas and coordinates, may be downloaded either immediately prior to departure of the UAV 202, may be initially download and periodically updated, or downloaded during transit using the communication device(s) 222. Further, the UAV 202 may include guidance sensors (e.g., GPS sensors, gyroscopes, accelerometers, proximity sensors, vision sensors, etc.) for self-determining location and position generally and with respect other surrounding objects. Software and/or hardware executing on the UAV 202 may use self-determined navigation data to augment navigation instructions received from an instance of the fulfillment application 310 (e.g., at a more centralized data center, the fulfillment center 220, etc.) as needed to handle localized events, which often may be unanticipated or difficult to predict due to the random nature of such events (e.g., movement of people, cars, acts of God, etc.).

Software on the UAV 202, which may represent an instance or aspect of the fulfillment application 310, or an instance of software executing in the fulfillment system 110, also represented by the fulfillment application 310, may determine an item transfer point (also simply referred to as a transfer point) for transferring a given package between the UAV 202 and an AGV 206.

In some instances, a transfer point may be located on the top of a docking station 204, such as a building, tower, dispatch vehicle, etc., and item(s) may be transferred from the UAV 202 to the AGV 206, or vice versa, through an elevator or other type of lift mechanism. In some instance, the exchange might be effectuated directly between the UAV 202 and the AGV 206. For example, the top of the AGV 206 may act as a transfer point where the UAV 202 can land and transfer the payload to the AGV 206 and/or receive a payload from the AGV 206. In some cases, the transfer point may include a communication device, which may communicate localized information, such as weather conditions at the transfer point, AGV 206 status, sensor readings (e.g., proximity sensor data reflecting distance during docking, etc.), docking station 204 status (e.g., availability data), UAV 202 status, a queue size of the number of items that are currently being transferred to an AGV 206, etc., and the UAV 202 may coordinating landing traffic of the UAVs 222 with the docking station 204 or other transfer point based on the localized information.

The AGV 206 may include wireless communication device(s) 236 that are used to connect to the wireless communication network through a wireless link and/or a wired network through a wired link (e.g., at a docking station 204). Through the communication device 236, geographic coordinates for the docking station 204 and/or the delivery point 212, and/or navigation routes may be communicated to the AGV 206. Mapping data for a delivery area may be downloaded either immediately prior to departure of the AGV 206, may be initially download and periodically updated using the communication device(s) 236, or may be downloaded during transit. Further, the AGV 206 may include guidance sensors (e.g., GPS sensors, gyroscopes, accelerometers, proximity sensors, vision sensors, etc.) for self-determining location and position generally and with respect other surrounding objects. Software and/or hardware executing on the AGV 206 may use self-determined navigation data to augment navigation instructions received from an instance of the fulfillment application 310 (e.g., at a more centralized data center, the fulfillment center 220, etc.) as needed to handle localized events, which often may be unanticipated or difficult to predict due to the random nature of such events (e.g., movement of people, cars, acts of God, etc.).

In some embodiments, the AGV 206 may use the communication device 236 to notify the shipping system 208 that the package has been delivered, and any delivery remarks, such as a locker combination, a photo of a person receiving the package, other confirmation and/or authentication information, etc.

The technology described herein may also be used in reverse to pick up packages. For instance, a retail ecommerce customer may wish to return an item due to a defect. The AGV 206 may transit to a pickup point, where the package is attached and transited to a transfer point where it is then conveyed to a UAV 202 for further transiting onto a warehouse or other delivery location.

It should be noted that, along with the other figures, FIG. 2 is not necessarily drawn to scale, but rather is depicted such that the various example components of the shipping system 308 can be described in detail.

FIG. 3B is a block diagram of an example vehicle 320. The vehicle 320 can embody a UAV 202 or an AGV 206. As shown, a vehicle 320 may include may include one or more sensor(s) 324, an actuator controller 326, one or more actuator(s) 328, a memory 330, a processor 334, and one or more communication device(s) 336. It should be understood that the vehicle 320 may include additional and/or few components, such as an operating system, embedded systems, firmware, other software, input and/or output devices, etc.

The sensor(s) 324 include sensing device(s) that are capable of detecting the state of the vehicle 320, its components, and/or its environment. Non-limiting example sensing device(s) include a gyroscope, accelerometer, thermocouple, touch sensor, proximity sensor, light sensor, 2D camera, 3D camera, time of flight (TOF) camera, stereo camera, sound sensor (microphone), pressure sensor, etc. Other types of sensors are also contemplated.

The actuator controller 326 is a device for controlling the actuator(s) 328 of the vehicle 320. For example, the actuator controller 326 send signals (e.g., motion commands, calibration commands, etc.) to the actuator(s) to control the movement or state of the vehicle 320, including the direction and speed of the vehicle 320 itself and/or its appendages and components. The actuator controller 326 may be comprised of hardware, software, and/or a combination of the foregoing. For example, the actuator controller 326 may comprise standard computer circuitry, firmware, etc., for controlling actuator(s) 328. In some implementations, the actuator controller 326 may be integrated with the processor 334 or may be distinct from but coupled to the processor 334 via the bus 318.

The actuator(s) 328 include mechanical and/or electrical devices that are capable of converting energy into motion. The actuator(s) 328 may be electric, pneumatic, hydraulic, magnetic, mechanical, thermodynamic, and/or magnetic, and/or a combination of the foregoing. Non-limiting example actuator(s) 328 include electric motors, combustion engines, servomechanism, hydraulic cylinders, pneumatic actuators, jet engines, corresponding gearing, connectors, and kinematic components, etc. The actuators are be coupled to components via linkages, transmissions, drivelines, hydraulics, and/or other assemblies, such as those including wheels, props, turbo fans, blowers, jets, and/or other components, that are capable of accelerating, decelerating, and steering the vehicle.

The processor 334 may execute instructions by performing various input/output, logical, and/or mathematical operations. The processor 334 may have various known computing architectures to process data signals. The processor 334 may be physical and/or virtual, and may include a single processing unit or plurality of processing units. In some implementations, the processor 334 may be capable of generating and providing electronic display signals to a display device (not shown), supporting the display of images, capturing and transmitting images, performing complex tasks including various types of feature extraction and sampling, etc. In some implementations, the processor 334 may be coupled to the memory 330 via the bus 318 to access data and instructions therefrom and store data therein. The bus 318 may couple the processor 334 to the other components of the vehicle 320 including, for example, the memory 330, the communication device(s) 336, the actuator controller 326, the sensor(s) 324, etc. It should be understood that the processor 334 may include a single device or multiple types of devices and have various different configurations.

The memory 330 stores instructions and/or data that may be executed by the processor 334. The instructions and/or data may include code for performing the techniques described herein. Examples include software instructions included in an instance of the fulfillment application 310, code received from other components of the system 100 and processed, firmware, operating system software, native guidance software, etc. The memory 330 includes a one or more non-transitory computer-usable (e.g., readable, writeable, etc.) media, which can be any tangible non-transitory apparatus or device that can contain, store, communicate, propagate or transport instructions, data, computer programs, software, code, routines, etc., for processing by or in connection with the processor 334. Non-limiting examples include DRAM, SRAM, PROM, FPROM, ROM, a hard disk drive, an optical disk drive (CD, DVD, Blu-Ray™, etc.), etc. It should be understood that the memory 330 may include a single device or may include multiple types of devices and configurations. In some embodiments, the memory 330 may store an instance of the fulfillment application 310, such as an instance of the guidance engine 332, and/or portions, which are accessible and executable by the processor 334.

The communication device(s) 336 (e.g., of which communication device(s) 236 are non-limiting example(s)) may include one or more interface devices for wired and/or wireless connectivity with the network 106, as reflected by the signal line, and the other components of the system 100. For instance, the communication device(s) 336 may include, but are not limited to, wireless transceivers for sending and receiving signals using Wi-Fi™; Bluetooth®, near-field communication (NFC), geo-positioning protocols, cellular communications, etc.; CAT-type interfaces; USB interfaces; various combinations thereof; etc.

In some embodiments, the communication device(s) may include sensors such as a Global Positioning System (GPS) sensor, Global Navigational Satellite System (GLONASS) sensor, Galileo system sensor, a BeiDou sensor, an IRNSS sensor, a QZSS sensor, a LIDAR sensor, an ultra-wideband sensor, a radio-positioning sensor, and/or a Real Time Location System (RTLS) sensor. An RTLS sensor may be a used to automatically identify and track the locations of vehicle(s) 320 in real time. In some cases, an RTLS may use active RFID, active RFID-IR, optical locating, infrared, low-frequency signpost identification, semi-active RFID, passive RFID RTLS locating via steerable phased array antennae, radio beacons, ultrasound identification, ultrasonic ranging, wide-over-narrow band, wireless local area network, Bluetooth®, clustering in noisy ambience, and/or bivalent systems to track the locations.

The communication device(s) 336 may be coupled to the other components of the vehicle 320 via the bus 318. The communication device(s) 336 may communicate using various standard communication protocols, including, for example, those discussed elsewhere herein.

Figure 3C:
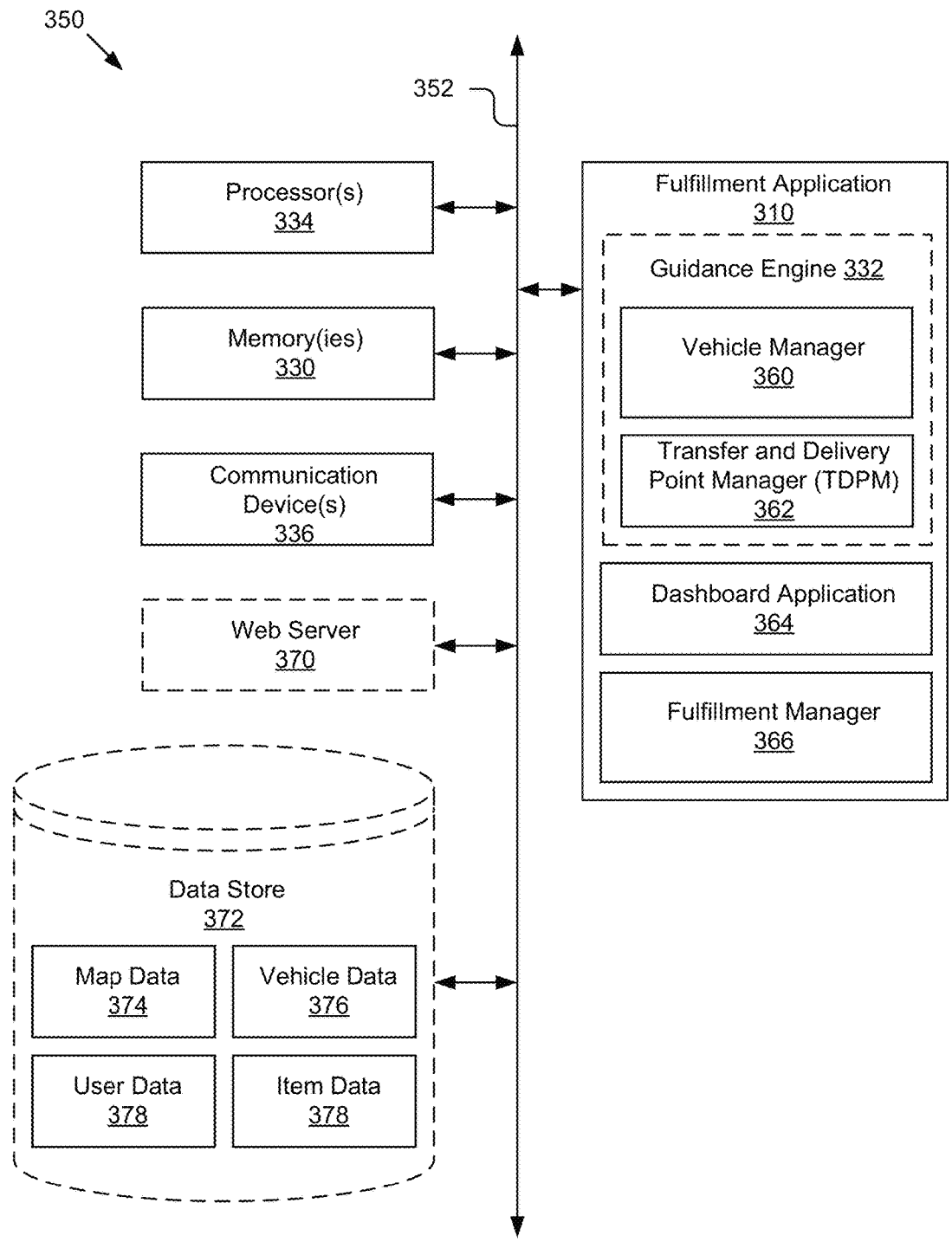
FIG. 3C is a block diagram of an example computing system.

FIG. 3C is a block diagram of an example computing system 350. As depicted, the computing system 350 may at least include processor(s) 334, memory(ies) 330, a communication device(s) 336, and/or a data store 372, which may be communicatively coupled by a standard communication bus 352. The computing system 350 may further include an instance a fulfillment application 310, and in some configurations, an instance of a web server 370.

The example computing system 350 may be applicable to a UAV 202, an AGV 206, a computing system of the fulfillment and/or ecommerce system 108, or a client device 140. For example, if representing a computing system of the fulfillment system 110, the computing system 350 may include an instance of the fulfillment application 310 that includes the guidance engine 332 and the fulfillment manager 366, and may have access to and/or include the data store, and/or may include an instance of the web server 370; if representing a UAV 202 or AGV 206, the computing system 350 may include an instance of the fulfillment application 310 (e.g., including instances of the guidance engine 332 (e.g., see example in FIG. 2), the fulfillment manager 366, etc.) and/or an instance of the data store 372 and/or data therefrom; and if representing a client device 140, the computing system 350 may include an instance of the dashboard application 364, etc. Other variations are also possible and contemplated.

The computing system 350 depicted in FIG. 3C is provided as an example and it should be understood that it may take other forms and include additional or fewer components without departing from the scope of the present disclosure, such as the components of an AGV 206 or UAV 202 (e.g., if reflecting the architecture of that component), standard input and output devices (e.g., pointer devices, keyboards, displays, etc.), and/or any other suitable computer components, etc. The processor(s) 334, the memory(ies) 330, and the communication device(s) 336 are discussed elsewhere herein and the description of these elements will not be repeated here.

The data store 372 is an information source for storing and providing access to data. The data stored by the data store 372 may be organized and queried using various criteria including any type of data stored by them, such as a robot identifier, a customer identifier, a particular location, a station, a time and/or date, a path, etc. The data store 372 may include data tables, databases, or other organized collections of data. Examples of the types of data stored by the data store 372 may include, but are not limited to, map data 374, vehicle data 376, user data 378, navigation data 230, etc., as discussed elsewhere herein.

The web server 370 includes computer logic executable by the processor 104 to receive, process, and respond to content requests. The web server 370 may include an HTTP server, a REST (representational state transfer) service, or other suitable server type. The web server 370 may receive content requests (e.g., page requests, vehicle status requests, map data requests, dashboard-related requests, (e.g., HTTP), etc.) from nodes on the network 106, cooperate with the e-commerce application 108 and/or fulfillment system 110 to determine the content, retrieve and incorporate data from the data store 372, format the content, and provide the content to the requesting nodes. In some instances, the web server 370 may format the content using a web language and provide the content to a corresponding dashboard application 364 for processing and/or rendering to the user for display, although other variations are also possible.

The web server 370 may be coupled to the data store 372 to store retrieve, and/or manipulate data stored therein and may be coupled to the e-commerce application 108 and/or the fulfillment application 310 to facilitate their operations.

The data store 372 may be included in the computing system 350 or in another computing system and/or storage system distinct from but coupled to or accessible by the computing system 350. The data store 372 includes one or more non-transitory computer-readable media for storing the data. In some implementations, the data store 372 may be incorporated with the memory(ies) 110 or may be distinct therefrom. In some implementations, the data store 372 may store data associated with a database management system (DBMS) operable on the computing system 350. For example, the DBMS could include a structured query language (SQL) DBMS, a NoSQL DMBS, a file system, flat files, various combinations thereof, etc. In some instances, the DBMS may store data in multi-dimensional tables comprised of rows and columns, and manipulate, e.g., insert, query, update and/or delete, rows of data using programmatic operations.

Map data 374 is data describing graphical, textual, geometrical, and/or other data for various service areas (e.g., geographical regions). The geographical regions may be indoor, outdoor, or a combination of both. For example, the map data 374 may include streets, roadways, sidewalks, paths, structures, and other building and transportation infrastructure for any geographical area being serviced by the fulfillment system 110. In some cases, the map data 372 includes data describing a floor plan for a home and/or other building(s) where vehicles 320 may navigate. In another example, the map data 374 includes data describing sidewalks of a road, aspects of a stadium or other venue, etc. Other types of map data are possible and contemplated.

The user data 378 may include profiles for each of the users of the system 100, such as the consumers ordering products using the ecommerce service, ordering items in-store, calling in orders to a service center, etc. The user data 378 may be correlated with the other types of data in the data store 108, for example 378. A given user's profile may include the user's user account and attributes describing the user. The user account may include information associated with the user's identity on the services provided by the system 300, such as a username, password, preference data, contact information (address, mobile number, electronic addresses (e.g., social network handles, email addresses, etc.), order history, delivery points associated with orders placed, delivery point preferences, payment information, etc. The attributes may characterize the user's preferences and/or identity.

The vehicle data 376 may include, but is not limited to, robot (AGV, UAV, etc.) identifiers and corresponding locations, zone limits, path portion limits, user limits, a Boolean indicating whether the vehicle(s) 350 are in-service, a path identifier reflecting the vehicle(s) 350 current path, and the user identifiers of the users assigned to the vehicle(s) 350.

The fulfillment manager 360 includes computer logic executable by the processor(s) 334 to manage the fulfillment by coordinating the guidance engine 332 with the other various components and/or subcomponents of the fulfillment system 110 and ecommerce system 108, as discussed in further detail elsewhere herein.

The fulfillment manager 360 stores and maintains data in the data store 372, such as the map data 374, the vehicle data 376, the user data 378, and the item data 378. The item data 378 includes information about each item in the system, such as a unique identifier for item carton, a type for the item, the priority of the item, the dimensions (e.g., X, Y, Z measurements) and weight of the item. In some cases, an item, such as a carton, may include sub-items (e.g., a plurality of products ordered by a customer, for example that are all placed in the same box), in which case the item data 378 includes a picklist defining the items contained by the carton. Some items may have a higher priority relative to other items and the fulfillment manager 366 may control the pick system 206, package system 204, and the shipping system 208 to expedite handling of those items with higher priority relative to other items in the system using the item data 378 reflecting such. The item data 378 may further include or be correlated with order information associated with the item (e.g., such as user data 378 including such), such as a delivery location (e.g., physical address, locker address, etc.), contact information and personally-identifying information describing the entity that ordered the item (e.g., person, organization, business, etc.).

In the illustrated embodiment, the guidance engine 332 includes a vehicle manager 360 and a transfer and delivery point manager (TDPM) 362, which are communicatively coupled to the bus 208 for communication with each other and/or other components of the computing device 200.

The vehicle manager 360 includes computer logic executable by the processor(s) 334 to allocate and assign vehicle(s) 350 (e.g., UAV(s) 202, AGV(s) 206), determine transfer points, coordinate transfers at transfer points, generate navigational instructions (e.g., calculate flight path(s) and driving route(s)), track status and health of vehicle(s), etc.

The vehicle manager 360 may calculate which UAV 202 or AGV 206 should be used for an item delivery at a given time. For instance, the vehicle manager 360 may continually receive the current status of each UAV 202 and AGV 206 in service, and, upon receiving a delivery request from the fulfillment manager 366 requesting fulfillment of an item or group of one or more items to a particular delivery point 212, computes and provides navigational instruction(s) to a select UAV 202, and to a select an AGV 206, if applicable. The UAV 202, and AGV 206 if application, execute the navigational instructions in order to effectuate delivery of the item. The methods for selecting the UAV 202, docking station 204, and/or AGV 206 for a particular delivery assignment are discussed in further detail elsewhere herein.

The TDPM 362 includes computer logic executable by the processor(s) 334 to determine delivery and transfer points, as described in further detail elsewhere herein.

The dashboard application 364 includes computer logic that, when executed by the processor(s) 334, renders user interfaces for display to a given user, and/or receives and processes user input received from the user. In the illustrated embodiment, the dashboard application 364 is communicatively coupled via the bus 352 for communication with the other components of the computing system 350. For example, the dashboard application 364 may retrieve data from the data store 372 and generate the user interfaces provided by it based thereon.

Other user interfaces and/or variations are also contemplated and encompassed by this document.

Figure 4:
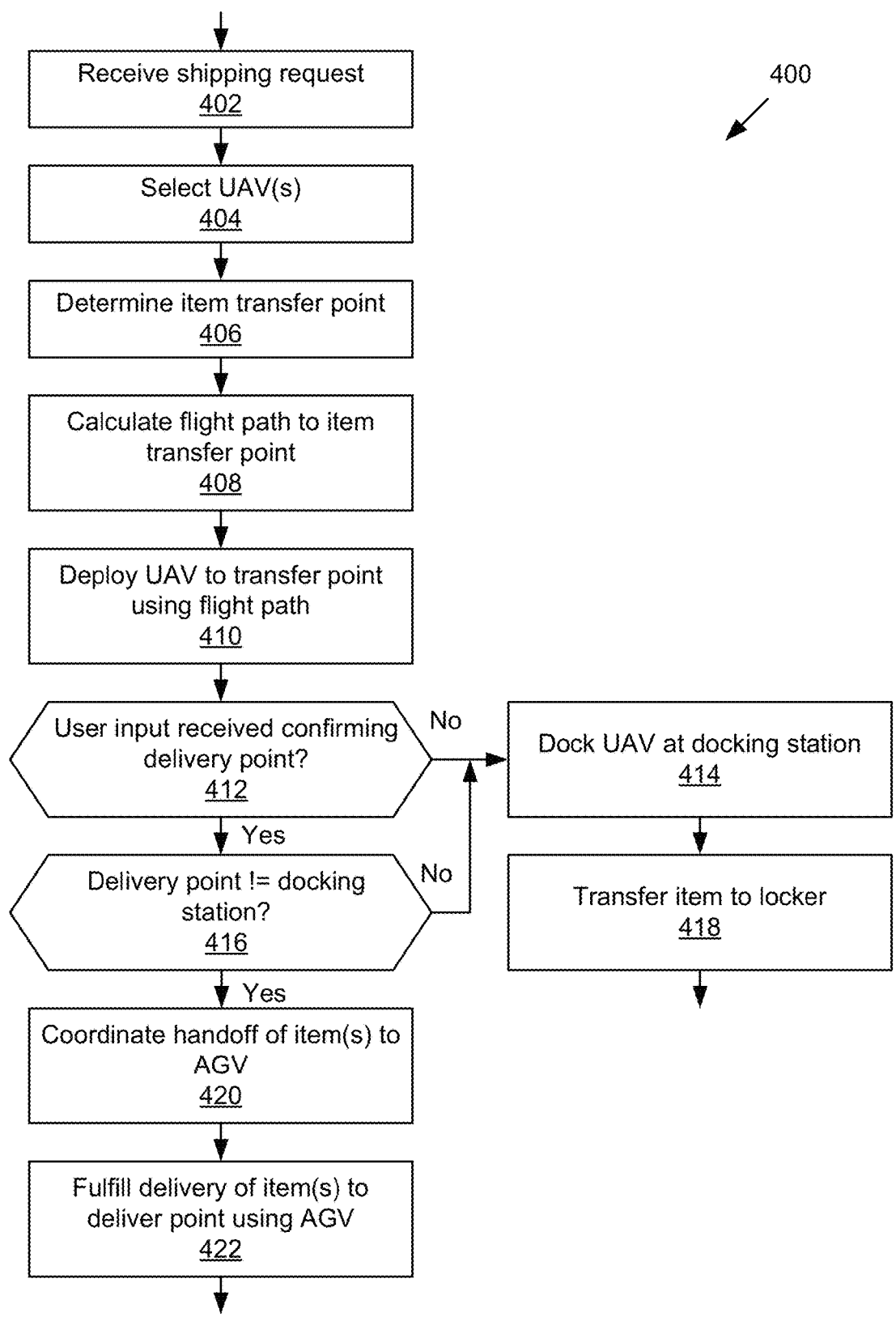
FIG. 4 is a flowchart of an example method for fulfilling delivery of an item using a variably multimodal platform.

FIG. 4 is a flowchart of an example method 400 for fulfilling delivery of an item using a variably multimodal platform.

In block 402, the fulfillment manager 366 receives a request to ship an item. In some embodiments, the fulfillment manager 366 may receive the request (e.g., an HTTP request, a procedure call, an asynchronous application programming interface call, instruction to run an object method, etc., and responsive thereto, may effectuate the loading of the item via a handling mechanism of a UAV. For example, to effectuate the loading, the handling mechanism may receive and secure the item from another entity (e.g., such as corresponding handing mechanism, a human, etc.), may retrieve and secure the item from another entity, may interface with another handling mechanism directly to transfer the item, etc., or include any other suitable structure and/or functionality. In a further example, the fulfillment manager 366 may operate the handling mechanism of the UAV 206 to autonomously pick and load/unload items (e.g., by instructing the actuator controller 326 to carry out a loading/unloading routine, etc.). The handling systems and/or mechanisms of the UAV(s) 202, docking station(s) 204 and/or AGV(s) 206 may be similarly controlled to effectuate item transfers between those entities.

In block 404, the vehicle manager 360 can select the UAV 202 to service the delivery request. In some embodiments, the fulfillment manager 366 may signal the vehicle manager 360 to select UAV(s) 202 to service the delivery request, and signal the TDPM 362 to determine the item transfer point. In some embodiments, transaction may include a plurality of items. This set of items may be designated to be delivered together and the vehicle manager 360 may select a plurality of UAVs to transport the set of items together such that they arrive at the transfer point at about the same time they can be transferred to the recipient or recipients in a coordinated way.

Figure 8:
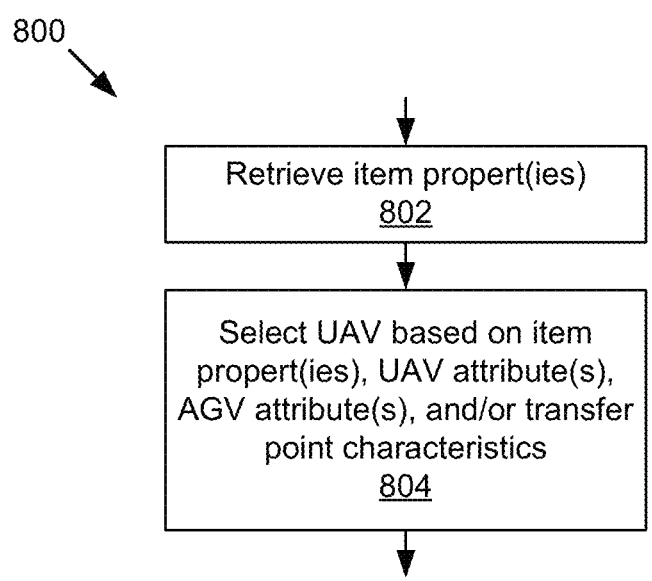
FIG. 8 is a flowchart of an example method for selecting a UAV for transiting an item to an item transfer point.

As shown in FIG. 8, which is a flowchart of an example method 800 for selecting a UAV 202 for transiting the item to the item transfer point, the vehicle manager 360 in block 802 may retrieve the item properties, which reflect properties of the item to be transited, such as but not limited, physical dimension(s) of the item (e.g., length, width, height, etc.), a priority of the item (e.g., reflecting whether delivery of the item is to be expedited, a due date and/or time for delivering the item, any exigent circumstances related to the delivery of the item (e.g., life or death, critical to important outcome, etc.), or any other suitable attributes related to the item.

In block 804, the vehicle manager 360 may select the UAV 202 based on the item properties and/or on one or more other attributes, such as UAV attributes, AGV attribute(s), and/or transfer point characteristic(s).

Examples of UAV attributes include a payload capacity, a range, a remaining time in service, a docking capability of the UAV reflecting one or more docking protocols supported by the UAV, etc. The docking protocols can reflect the technical ability of the UAV to dock with different types of receivers at a transfer point, such as different types of docking stations 204 and AGVs 206.

In some embodiments, the vehicle manager 360 can compare the UAV attributes to the attributes of the item properties, and select a UAV that is compatible with the item to be delivered. For example, the vehicle manager 360 can compare one or more physical dimension(s) of the item to an available payload capacity of the UAV and determine whether or not the item can be accommodated based on the available payload capacity. Additionally or alternatively, the vehicle manager 360 can compare the weight of the item to the payload capacity to determine whether the UAV can accommodate an item having such a weight. In additional or alternative examples, the vehicle manager 360 can select the UAV based on the UAV's range and/or remaining time in service.

In some embodiments, the UAV 202 may be selected based on a group of AGVs 206 associated with the item transfer point, in which case the operations of block 406 may be performed prior to the operations in block 404, and the vehicle manager 360 can, when selecting the UAV 202, base the selection on additional and/or alternative parameter(s) to the item propert(ies) and/or UAV attribute(s), such as but not limited to one or more AGV attribute(s) and/or one or more characteristics of the transfer point.

For example, particular UAVs may have a certain amount of travel range left, due to for example an available battery capacity, and/or management parameters may be set to require UAVs to be placed in an inactive state for certain periods of time (e.g., for inspection purposes, to allow the components to rest at a steady state, etc.), and the vehicle manager 360 may select a UAV that has the requisite range to travel to and/or back from the transfer point and/or a UAV that has a sufficient amount of time remaining in service before being maintained, and/or temporarily and inactivated or sidelined, utilized for an alternative purpose, etc.

Example AGV attributes include a transfer capability of the AGV 206, the payload capacity of the AGV, an availability of the AGV 206, a location of the AGV 206, etc. Example transfer point characteristics include a transfer capability of the docking station, a refueling capability of the docking station, a communication capability of the docking station, a capacity of the docking station, UAV traffic at the docking station, etc.

Using the AGV attribute(s) and/or the transfer point characteristic(s), in addition and/or alternative to the item propert(ies) and/or UAV attribute(s), the vehicle manager 360 can factor in further constraints that could affect an effective transfer by the UAV 202.

For example, certain types of AGV(s) having the same and/or different docking capabilities at the transfer point may be factored into which UAV 202 is selected, such that the UAV 202 with a compatible docking protocol is selected to engage with and transfer the item indirectly or directly to the AGV 206 that is selected to engage with the UAV 202.

In a further example, a workload at a given transfer point may be high and AGVs 206 may not readily be available upon arrival of the UAV 202 to the transfer point, in which case the UAV 202 may need to hover, land and wait, stage the item at a docking station at the transfer point, or take some other action, and the vehicle manager 360 may select a UAV 202 that has sufficient fuel (e.g., battery charge) to power the UAV 202 to wait for any requisite period of time and make a return trip to the point of dispatch, may select a UAV 202 that is compatible with a refueling capability (e.g., charging protocol and interface) at the transfer point, that is compatible with a docking protocol at the docking station (e.g., mechanical interfaces match for transferring the item, UAV size and type is supported, item transfer communication protocol between the UAV and the docking station supported, etc.), etc.

In block 406, the TDPM 362 determines an item transfer point based on the delivery point of the item for which the shipping request was received. The item transfer point indicates the geographical location where the item is to be transferred from the UAV 202 to one of a docking station and an AGV 206 based on the delivery point. In some embodiments, a plurality of item transfer points are predefined and stored as the map data 374 in the data store 372, and the TDPM 362 determines the appropriate transfer point based on the proximity of the transfer point to the delivery point. In some cases, the delivery point may coincide with the transfer point based on a confirmation that is received, as discussed further elsewhere herein. In some cases, the delivery point may be dynamic, as also discussed elsewhere herein, and the TDPM 362 may initially determine and redetermine the transfer point and/or the delivery point based on current information that is being received by the fulfillment application 310.

In some examples, the transfer point may provide delivery coverage for a several block radius. Around airports, or other flight-restricted areas, delivery points may be setup around the perimeter of the flight-restricted area, and delivery areas for the transfer point may provide significant overlap into the flight restricted area.

In block 408, the guidance engine 332 may calculate a flight path to the item transfer point, which the guidance engine 332 may use to navigate the selected UAV 202 to the transfer point. Calculation of the flight path may take place either partially or entirely on the UAV 202, a centralized server, or some other suitable computing system 350. The guidance engine 332 may optimize the flight path to represent as direct of a path to the transfer point as possible in some embodiments. For instance, in some cases the flight path may include a straight or substantially straight line or arc from the place where the item is loaded 404 onto the UAV 202 to the transfer point. In some embodiments, the guidance engine 332 may account for tall structures or other obstacles and restricted areas and calculate a path including a combination of straight portions, vertical ascent(s), vertical decent(s), etc. Numerous factors may further impact calculation of the flight path, including but not limited to, flight restricted areas, weather, and designated transportation corridors.

In some cases, the flight path may be continuously updated, and if necessary, adjusted based on the flight conditions of the UAV 202. For example, the UAV 202 may include machine vision that can detect an oncoming object while in flight. For example, a power line may be unaccounted for in downloaded aerial maps, but the UAV 202's machine vision may determine during flight that the calculated flight path is dangerously close to a powerline and may adjust and recalculate the flight path accordingly. Despite the particularities of the implementation, the UAV 202 may be transited 412 to the transfer point based on the calculated flight path.

It should be understood that any suitable available methods for determining optimal flight path based on current conditions, such as weather conditions, destination conditions, air traffic, air traffic restrictions, and so forth, may be used by the guidance engine 332 and are contemplated.

In block 410, the guidance engine 332 may deploy the UAV 202 to the item transfer point using the flight path, upon arriving at the transfer point, may transfer the item from the UAV 202 to one of the docking station and an AGV 206.

The fulfillment application 310 may determine the transfer the item to different recipients, such as a docketing station or AGV 206, based on the delivery point. In a docking station embodiment, the TDPM 362 may determine to transfer the item from the UAV 202 to a handling system of the docking station 204 based on the delivery point, coordinate a handoff of the item between a port of the handling system of the docking station and the UAV 202, and transfer the item through the port of the docking station 204 or in a designated area using the handling mechanism of the UAV 202. In some cases, the fulfillment manager 366 may hold the item in a locker, such as the locker 240 associated with the docking station 204 in FIG. 2, for pickup by a retriever, or hold the item in temporary storage for later AGV or UAV dispatch, or holding in the locker. The locker may include or be coupled to an electronic interface, in some cases, via which a user can input verifiable information and retrieve the stored item(s), or in other cases, may be manned by an assistant, include a key lock unlockable by the user, etc.

In some embodiments, the multimodal nature of the delivery may vary based on incoming input from a user, such as an intended recipient of the item, a delegate of the recipient, an administrator, or another suitable user.

For example, in block 412, the fulfillment application 310 may receive user input confirming a delivery point. If so, the TDPM 362 may determine whether the delivery point is the docking station in block 416, an if so, the guidance engine 332 may dock the UAV 202 at the docking station as reflected in block 414. If not, the method may proceed to block 420 as discussed below. Responsive to being docked in block 414, the item may be transferred to a locker or other temporary storage as reflected in block 418. In some embodiments, in transactions where a plurality of items are being collectively transited from a fulfillment center 220 to a docking station 204, the docking station may receive transfers from a group of UAVs 202 transiting these related items at about the same time. For example, in a fulfillment center 220 that has the capability of receiving items from different UAVs 202 at the same time, the fulfillment center 220 may receive some or all of the related items at the same time, or in a fulfillment center 220 that is capable of receiving less than all the items at the same time, the items may be received serially by the UAVs 202 or the items may be received in a combined series/parallel fashion depending on the capabilities of the fulfillment center 220. Further, in some cases, the UAV 202 may be capable of transferring multiple items simultaneously to a docking station 204 and/or an AGV 206, and or receive multiple items from a docking station 204 and/or an AGV 206, as the case may be.

In some cases, a user input confirming delivery point may have overridden a prior delivery point, such as one in which the item was to be delivered to a location remote from the docking station by and AGV 206. Alternatively, the user input may have reconfirmed the existing delivery point (the docking station), or may have confirmed an alternative docking station to that initial docking station that had been selected. Further variations are also possible and contemplated.

Figure 5:
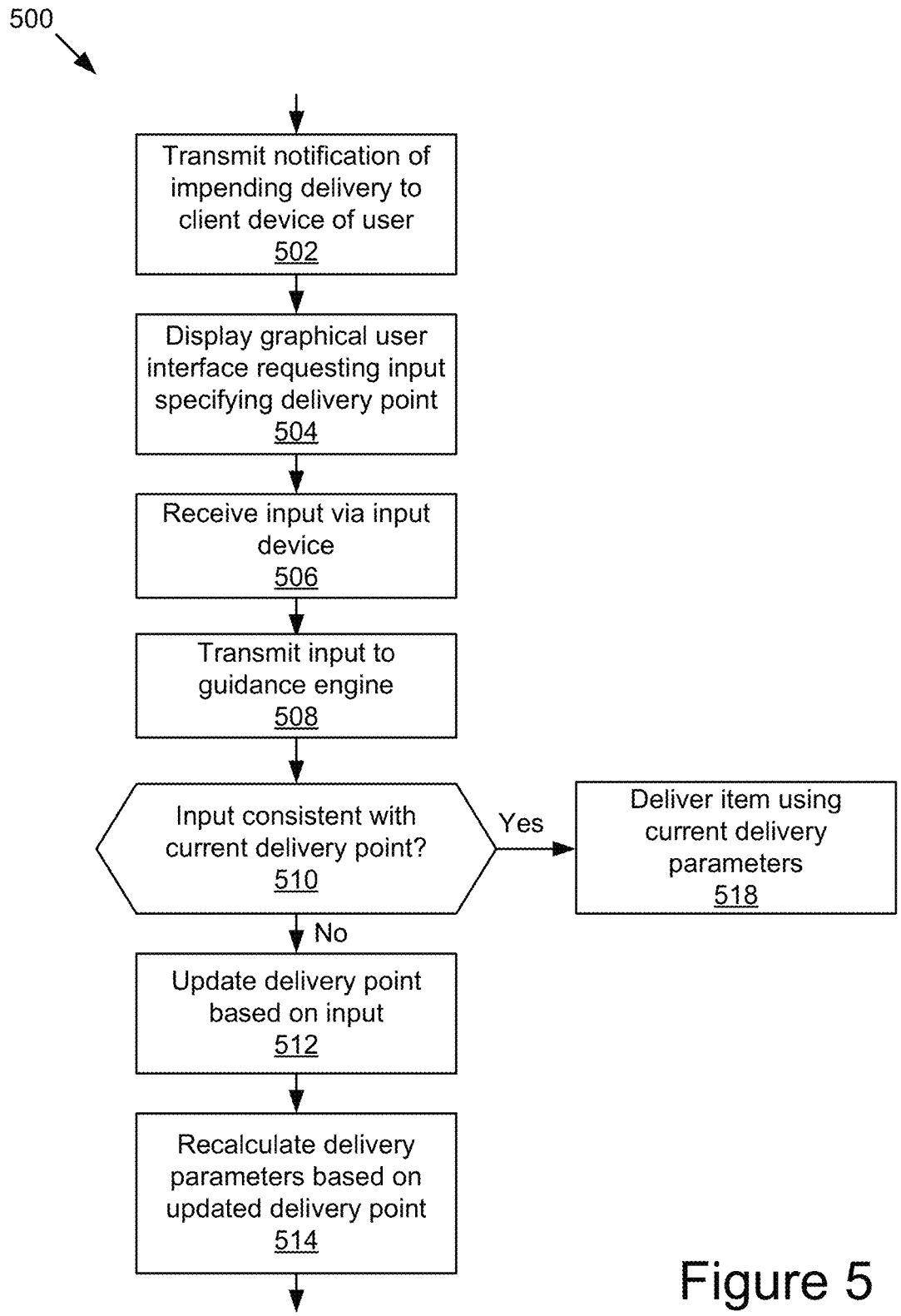
FIG. 5 is a flowchart of an example method for calculating a delivery point.

FIG. 5 is a flowchart of an example method 500 for calculating a delivery point. In block 502, the dashboard application 364 transmits notification of impending delivery to the client device of the user, and in block 504, displays a graphical user interface requesting input specifying the delivery point.

In some embodiments, a native application, such as but not limited to an "app" downloaded from an application marketplace, may receive and display a push notification notifying the user that delivery of the item is transpiring soon and requesting input specifying the delivery point. In some embodiments, an electronic message (e.g., text message, chat message, social network message, email message, etc.) may been transmitted and a notification of such displayed in the graphical user interface in block 504. In some embodiments, a user may log into a fulfillment portal embodied by the graphical user interface in which a graphical element provide certification to the user of the impending delivery requests user input confirming the delivery point. In some embodiments, with or without the notification a block 502, the user may provide, via a graphical user interface, a voice command using a voice actuated interface, a gesture command using a gesture based interface, or other suitable available interface, input initially specifying or confirming (changing or reconfirming) the delivery point.

Figure 6:
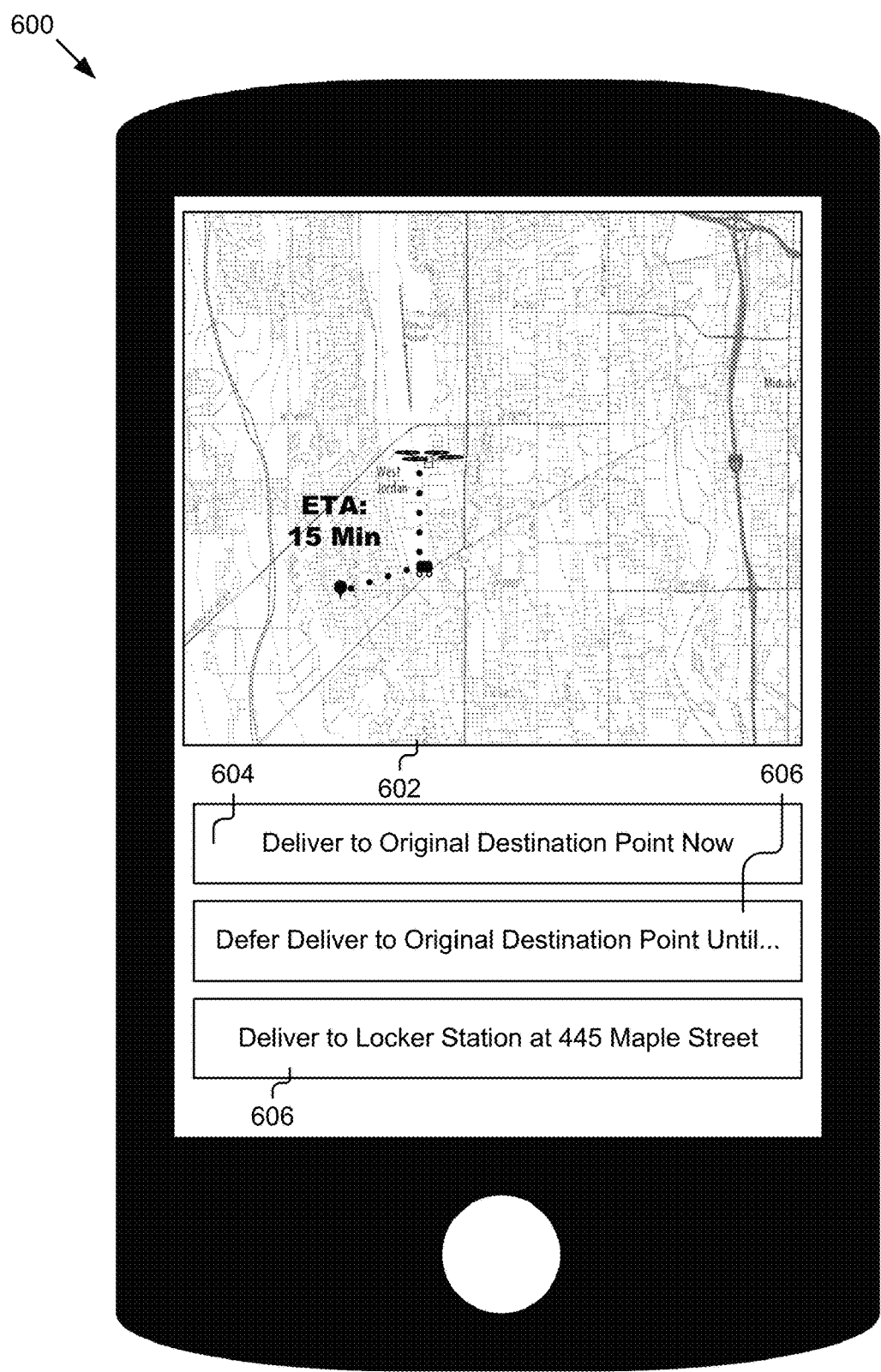
FIG. 6 is a graphical representation of an example graphical user interface of the dashboard application.

FIG. 6 is a graphical representation of an example graphical user interface of the dashboard application 364. In the depicted example, interface includes a map region showing a current delivery status. In particular, a graphical representation of the UAV 202 carrying the item is depicted as approaching the transfer point, graphic representation of the AGV 206 is depicted at the transfer point, and a graphical representation of the delivery point is depicted as a pin. A dotted line simulating the flight path and the route of the UAV 202 and the AGV 206, respectively, is also shown. The graphical user interface further includes options for the user to select to proceed with the current delivery, defer the delivery, or change the delivery point. For example, selecting graphical user interface element 604 would result in the item being delivered is currently planned, selecting the graphical user interface element 606 would result in the item being delivered to the current delivery point at a later time (e.g. a user configurable time, a default later available time, etc.), and selecting graphical user interface element 608 would result in the item being delivered to an alternative delivery point, which in this example is the locker station at 445 Maple St., although any other delivery point may be suitable such as the user-input address, a selection from among a plurality of locker stations, etc.

Returning to FIG. 5, in some cases, an initial delivery point may have already been specified or may, by default have been determined, based on transactional information associated with the ordering of the item. For example, in the scenario where the user ordered the item via the ecommerce service, a shipping address may have been input and/or may have been previously input and stored as user data 378 and confirmed by the user via an input received an interface of the e-commerce service during the transaction. The graphical user interface displayed in 504 may include information showing the current delivery point and requesting confirmation of such. Further example, the delivery point address may have been provided during a call with a call center in which the item was ordered, may been provided during an in-store visit and input into a point-of-sale system, etc. Numerous additional examples are also possible and contemplated.

In block 506, the dashboard application may receive an input via an input device from the user, and in block 508, the dashboard application 364 may transmit the provided input to the guidance engine 332, which in turn, may determine in block 510 whether the input is consistent with the current delivery point, if any. If it is, the guidance engine 332 may continue in block 518 to have the item delivered using the current delivery parameters. If it isn't, the guidance engine 332 (e.g., via the TDPM 362) may update the delivery point in block 512 based on the input and may recalculate in block 514 (e.g., via the TDPM 362) the delivery parameters based on the updated delivery point, which in turn, may cause a change to the transfer point, a change to the type of recipient that is to receive the transfer of the item from the UAV 202 (e.g., docking station 204 vs. AGV 206), etc., depending on the time in which the change in the delivery parameters was made.

By way of example, the guidance engine 332 may initially determine to transfer the item from the UAV 202 to the AGV 206 based on the delivery point. Then, during transit of the item by the UAV 202 to the delivery point, the guidance engine 332 may receive a signal requesting a change to the delivery point (e.g., as discussed above) and determining to transit the item to an alternative delivery point corresponding to the change using the AGV 206. As a result, the guidance engine 332 may determine to transfer the item from the UAV 202 to the docking station instead of the AGV 206 based on the change to the delivery point.

Referring again to FIG. 4, alternatively, in block 412, a specific delivery point may have not been provided, and no delivery point confirmation may have been received, in which case the UAV 202 may be docked at the docking station at the transfer point, in the item may be placed in a locker or other temporary storage as reflected in block 418. In some cases, a delivery point confirmation may be received after the operations in block 418 up and executed, and the item may be processed accordingly. For example, an item placed in temporary storage may be retrieved and then transferred to and AGV 206 for delivery to the confirmed delivery point, may be transferred from every storage to a locker for pickup, etc.

Figure 7:
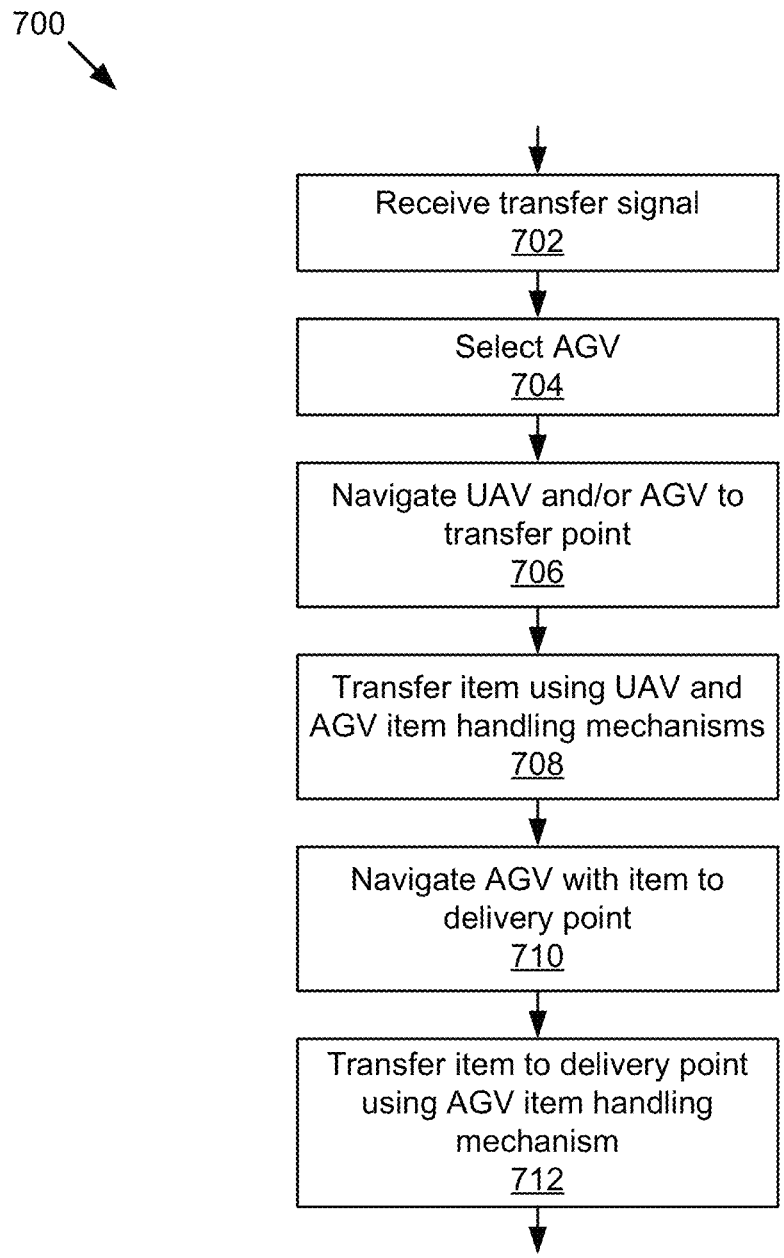
FIG. 7 is a flowchart of an example method for transferring item from a UAV to an AGV and fulfilling delivery thereof.

With reference again to FIG. 4, in an AGV embodiment, the TDPM 362 may coordinate a handoff of the item between a selected AGV 206 and the UAV 202 as reflected in block 420, and fulfill delivery of the item in block 422 to the delivery point using the AGV 206. FIG. 7 is a flowchart of an example method 704 for transferring item from the UAV 202 to an AGV 206 and fulfilling delivery thereof.

In block 702, the vehicle manager 360 receives a transfer signal to transfer the item being transited by the UAV 202 to an AGV 206. In response, the vehicle manager 360 select may, in block 704, select an AGV 206 that is associated with the transfer point and is capable of delivering the package to the delivery point. In some embodiments, the vehicle manager 360 may select an AGV 206 from a group of AGVs associated with the item transfer point based on one or more item propert(ies), UAV attribute(s), AGV attribute(s), and/or delivery point characteristic(s).

In an example, the vehicle manager 360 may select the AGV 206 based on the item handling mechanisms of the AGV 206 and the UAV 202 being compatible. For example, the vehicle data 376 may reflect which AGV 206 and UAV 202 handling mechanisms are compatible for direct transfer (e.g., such that the item carried by the UAV 202 may be automatically and properly transferred to the AGV 206, or vice versa based on a reverse implementation in which the vehicle manager 360 is selecting a UAV 202 that is compatible with the AGV 206 for a transfer of the item from the AGV 206 to the UAV 202). In some embodiments, the transfer may be indirect, such as in the scenario where the UAV 202 sets the item down (e.g., on the ground, on a staging platform, etc.) using its handling mechanism, and the AGV 206 then proceeds to pick that item up using its handling mechanism. In these embodiments, the vehicle manager 360 may compatibly select an AGV 206 that is capable of picking up such an item. Numerous additional variations are also possible and contemplated.

In an example, the vehicle manager 360 may select the AGV 206 based on an available payload capacity corresponding to one or more of a dimension and weight of the item and/or and an available deployment time corresponding to a targeted delivery time for delivering the item to the delivery point. For instance, as with the UAVs 202, the vehicle manager 360 can compare one or more physical dimension(s) of the item to an available payload capacity(ies) of the AGVs 206 and determine which AGVs 206 can accommodate the item based on their available payload capacity(ies). Additionally or alternatively, the vehicle manager 360 can compare the weight of the item to the payload capacity(ies) to determine which AGVs 206 can accommodate an item having such a weight. In additional or alternative examples, the vehicle manager 360 can select the AGV 206 based on the AGV's 206 range and/or remaining time in service.

In an example, as with UAVs 202, AGVs 206 may have a certain amount of travel range left, due to for example an available battery capacity, and/or management parameters may be set to require UAVs 202 to be placed in an inactive state for certain periods of time (e.g., for inspection purposes, to allow the components to rest at a steady state, etc.), and the vehicle manager 360 may select an AGV 206 that has the requisite range to travel to and/or back from the delivery point and/or an AGV 206 that has a sufficient amount of time remaining in service before being maintained, and/or temporarily and inactivated or sidelined, utilized for an alternative purpose, etc.

In an example, the vehicle manager 360 may select the AGV 206 by matching a characteristic of the delivery point to a mechanical delivery capability of the AGV. For instance, the protocol at the delivery point may require the AGV 206 to remain at the delivery point and act as a locker. In this example, the AGV 206 may include a portal, such as a door, that may be accessed by a recipient provisioning the proper credentials. Examples include a user that selects, via a graphical user interface presented by the dashboard application 364 on the portable electronic device, a graphical user interface, such as a button, requesting the AGV 206 to open and provide access to the delivered item, and responsive thereto, the fulfillment application 310 may relay a signal to the AGV 206 authorizing the AGV 206 to relinquish the item to the user (e.g., by unlocking a locker door and providing access to the item, by injecting the item using the AGV 206's item handling mechanism, etc.).

In another example, the protocol of a given delivery point could require certain type of delivery be provisioned by AGV 206, in which case a specific AGV 206 matching the delivery point requirements may be selected by the vehicle manager 360.

If more than one AGV 206 is available that meets the selection criteria, the vehicle manager 360 may randomly select between the matching AGVs 206, may select an AGV 206 that is next in queue (or the queue may be sorted using a first-in-first-out (FIFO) algorithm, or other suitable sorting criteria).

In any of the above examples, or combinations of the above examples, a given AGV 206 may be designated to receive and/or be service by a plurality of UAVs 202. Some cases, an AGV 206 is capable of receiving items from two or more UAVs at the same time, in which case the guidance engine 332 can coordinate the order in which the AGV 206 receives the items from the various UAVs 202, which may occur in parallel, partially in parallel and partially in series, etc. In some cases, an AGV 206 is capable of receiving items from a single UAV 202 at a given time, and the guidance engine 332 stages the UAVs 202 that are scheduled by the guidance engine 332 to deliver their respective items to the AGV 206 during a given replenishment cycle. The staging may be done using any suitable algorithm, such as a FIFO algorithm, an algorithm based on shipping priority, expedited status, urgency, or any other suitable parameters.

Referring again to FIG. 7, in block 706, the guidance engine 332 may navigate the UAV 202 and/or the AGV 206 to the transfer point. In some cases, the AGV 206 may already be at the transfer point, and the UAV 202 may be navigated to the AGVs position by the guidance engine 332. As discussed elsewhere herein, the UAVs 202 and AGVs 206 may be location aware and their computing systems (e.g., 320, 350, etc.) may provide routine updates to the fulfillment application 310 reporting their respective locations so they can be tracked in real time, and the guidance engine 332 can perform the acts and functionality described herein, such as providing navigational instructions to the UAVs 202 and AGVs 206. As discussed elsewhere herein, and AGV 206 may receive a plurality of items for different delivery points, and is capable of temporarily storing/staging those items as the AGV 206 navigates its delivery route the traverses those different delivery point, and then unloading the items that the respective delivery point at the appropriate time.

In block 706, responsive to the UAV 202 and/or AGV 206 be navigated to the transfer point, the method 700 may transfer the item using the UAV 202 and AGV 206 item handling mechanism. Responsive to the AGV 206 receiving transfer of the item, the guidance engine 332 may navigate the AGV 206 with the item to the delivery point.

For the navigation, the guidance engine 332 may calculate a route for the AGV from the item transfer point to the delivery point. The route may take into account roads, speed limits of roads, and the directness of a particular route, amongst other things. In general, the route map be calculated with a map graph using an A* search algorithm, or a variation thereof. Any suitable autonomous navigation techniques may be utilized by the guidance engine 332 to navigate the AGV 206 to the delivery point. With respect to the vehicles guided by the guidance engine 332, such as the AGVs and the UAVs 202, the guidance engine 332 may cooperate with the actuator controller 326 to control the actuator(s) 328 of the vehicle effectuate the movement of the vehicles (AGVs, UAVs, etc.) to/from the various locations being navigated.

On some routes, map information surrounding the delivery point may not be available, or local decisions and/or route augmentations may be made by computing system of the AGV 206, and the AGV 206 may use a combination of machine vision, sensor input, and heuristics to arrive at the delivery point. For example, a long driveway in front of a house may not be included in available mapping information, but the AGV 206 may capture and process images from the roadside to determine that the driveway is the path of least resistance to a delivery point in front of a garage at the residence. Further, obstacles and dynamic situational constraints may detected by the sensors of the AGV 206 and accounted for by the guidance engine 332 in adapting the route and autonomously navigating the AGV 206 to the delivery point. Despite the particularities of the implementation, the AGV 206 may be transited 412 to the delivery point based on the calculated route.

Responsive to arriving at the delivery point, the AGV 206 may unload the item at the delivery point. In some embodiments, as shown in block 714, the AGV 206 may transfer the item to the delivery point using the AGV 206 item handling mechanism. For example, the delivery point may include a parcel station capable of interfacing with the AGV 206 item handling mechanism and receiving the item automatically. In this example, the parcel station may be coupled to the fulfillment manager 366 and capable of communicating with the AGV 206 and/or the fulfillment manager 366 to effectuate the secure transfer of the item. For instance, the AGV 206 may signal a computing system of the parcel station to prepare to receive the item, receive a signal confirming such, signal its item handling mechanism to interface with the handling mechanism of the parcel box, and control the item handling mechanism such that it conveys the item to a compatible handling mechanism of the parcel box. In some cases, the parcel box may open a door and reveal void into which the AGV 206 item handling mechanism may insert the item, and then the parcel box may proceed to close and secure the door.

In a further example, the AGV 206 item handling mechanism may set the item down in an entry, may enter a building, and deliver the item to a receptionist, in which case the AGV 206 may include an input device, such as a display screen, keypad, etc. Into which the user may input his/her information and/or provide a digital signature for the item. The fulfillment manager instance 360 operating on the AGV 206 and receive and store the information input by the receptionist in association with the item and/or user, for example, to record the transfer.

Numerous other variations for provisioning the item are also possible and contemplated, as discussed elsewhere herein.

It should be understood that various operations of the methods described herein, such as method 400, may be performed in reverse or have other ordering. In particular, it should be appreciated that handoffs between a docking station 204 or AGV 206 and a UAV 202 may be reversed, such that items may be sent from any arbitrary locations that are serviceable by the AGVs 206, whether former or current delivery points or not, via the AGVs 206 to other locations businesses or residences, organizations, docking stations, fulfillment centers, return centers, etc. In an example, users may return items received the delivery points back to the fulfillment centers 204 from which they received them a scheduling a pickup by an AGV 206. In another example, users may use the reverse approach as a parcel service to ship any arbitrary items other locations.

The guidance engine 332 can navigate the AGV 206 to pick up the item(s) being shipped. Further, similar to the transfer between the UAV 202 and the AGV 206 that occurs when the filling in order, the AGV 206 may transfer the items being shipped in reverse to one or more UAVs 202 for transfer back to the fulfillment centers. Alternatively, the AGV 206 may transfer the item(s) to one or more docking stations 204, at which the items may be loaded into trucks or other vehicles in the reverse manners described above with respect to how the docking stations 204 may receive items from UAVs 202. The same or similar attributes may be used by the guidance engine 332 to select the appropriate UAVs 202 to service the AGV's 206 and/or docking stations 204, and as such the description of those acts and functionality the utilizes attributes will not be repeated here for the purposes of brevity.

It should be understood that various portions of the methods described herein could represent various segments of one or more larger methods and may be concatenated or various steps of these methods may be combined to produce other methods which are encompassed by the present disclosure. Additionally, it should be understood that various operations in the methods described may, in some cases, be iterative and thus repeated as many times as necessary generate the results described herein. Further the ordering of the operations in the methods described are provided by way of example and it should be understood that various operations may occur earlier and/or later in the method, or in reverse order, without departing from the scope thereof.

Figure 9:
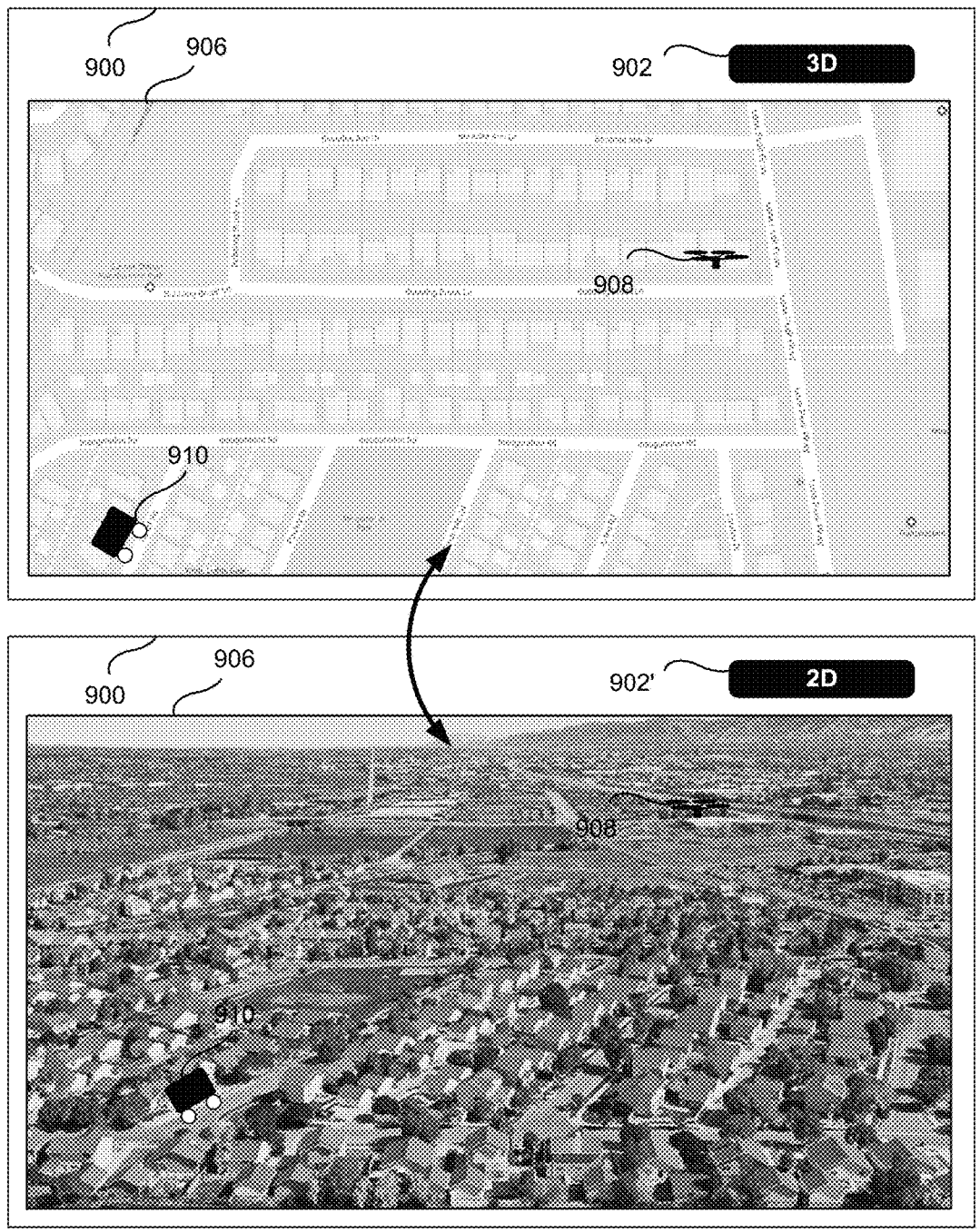
FIG. 9 is a graphic representation of example interface for monitoring AGVs and UAVs that are in the field.

FIG. 9 is a graphic representation of example interface 900 for monitoring AGVs 206 and UAVs 204 that are in the field. In a particular depicted example, the graphical user interface 900 includes a map content region displaying a toggleable map region 906. The toggleable map region 906 is toggleable between a two-dimensional and a three-dimensional view. For example, responsive to receiving via an input device the selection of the graphical user interface element 902 (e.g. button labeled "3D"), the dashboard application 364 updates the toggleable map region 906 to display a three-dimensional view of the view depicted in two dimensions previously. As the view is toggled between two and three dimensions, the text of the graphical user interface element 902/902' may also change to correspond. For instance, responsive to toggling the view to three dimensions, the dashboard application 364 may update the graphical user interface element 902 include text reflecting that it may be selected to change the view back to two dimensions, as shown in the version of the graphical user interface element labeled 902'.

The toggleable map region 906 includes graphical representations of UAVs and AGVs service in that area. For instance, in this particular example, UAV 908 is depicted in flight then AGV 910 is depicted as being located on a particular road. The case that AGV 908 was approaching AGV 910 in anticipation of docking with that and transferring various item(s) carried by it to the AGV 910, the graphical user interface could display graphical indicators showing the approach, showing the specific communications/signals being sent between AGV 910 and UAV 908 as part of the docking procedure/protocol, and any success/error messages in association with the transaction. This advantageously allows an administrator to observe transfers that are occurring, as well as navigate using the map (and various input controls for manipulating the same) to other regions or areas in which transfers are occurring and are expected to occur, or issues have been reported and further investigation is being performed. Extensions and variations of the dashboard application 364, and the various user interfaces discussed herein, as well as numerous other applicable user interfaces, are also possible and contemplated. Further, it should be understood that while various particular examples of graphical user interfaces are provided herein, it should be understood that the interfaces may take other forms, include additional and/or fewer elements, may be formatted in different ways, etc., without departing from the scope of the present disclosure.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms such as "processing," "computing," "calculating," "determining," "displaying," or the like, refer to the action and methods of a computer system that manipulates and transforms data represented as physical (electronic) quantities within the computer system's registers and memories into other data similarly represented as physical quantities within the computer system memories or registers or other such information storage, transmission or display devices.

A data processing system suitable for storing and/or executing program code, such as the computing system and/or devices discussed herein, may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices can be coupled to the system either directly or through intervening I/O controllers. The data processing system may include an apparatus may be specially constructed for the required purposes, or it may comprise a general-purpose computer selectively activated or reconfigured by a computer program stored in the computer.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

The foregoing description has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects may not be mandatory or significant, and the mechanisms that implement the specification or its features may have different names, divisions and/or formats.

Furthermore, the modules, routines, features, attributes, methodologies and other aspects of the disclosure can be implemented as software, hardware, firmware, or any combination of the foregoing. The technology can also take the form of a computer program product accessible from a computer-usable or computer-readable medium providing program code for use by or in connection with a computer or any instruction execution system. Wherever a component, an example of which is a module or engine, of the specification is implemented as software, the component can be implemented as a standalone program, as part of a larger program, as a plurality of separate programs, as a statically or dynamically linked library, as a kernel loadable module, as firmware, as resident software, as microcode, as a device driver, and/or in every and any other way known now or in the future. Additionally, the disclosure is in no way limited to implementation in any specific programming language, or for any specific operating system or environment. Accordingly, the disclosure is intended to be illustrative, but not limiting, of the scope of the subject matter set forth in the following claims.

What is claimed is:

1. A method comprising:
   receiving a request to ship an item;
   loading the item via a handling mechanism of an unmanned aerial vehicle (UAV);
   determining an item transfer point based on a delivery point, the item transfer point indicating a geographical location where the item is to be transferred from the UAV to one of a docking station and an autonomous ground vehicle (AGV) based on the delivery point;
   calculating a flight path to the item transfer point;
   deploying the UAV to the item transfer point using the flight path; and
   transferring the item from the UAV to one of the docking station and the AGV including determining to transfer the item from the UAV to a handling system of the docking station based on the delivery point, coordinating a handoff of the item between a port of the handling system of the docking station and the UAV, and transferring the item through the port of the docking station using the handling mechanism of the UAV.

2. The method of claim 1, further comprising:
   initially determining to transfer the item from the UAV to the AGV based on the delivery point;
   receiving, during transit of the item by the UAV to the delivery point, a signal requesting a change to the delivery point; and
   determining to transfer the item from the UAV to the docking station instead of the AGV based on the change to the delivery point.

3. The method of claim 1, wherein the item is transferred to the docking station, and the method further comprises:
   holding the item in a locker associated with the docking station for pickup by a retriever.

4. The method of claim 1, further comprising:
   displaying, on a display of a display device coupled via a computer network to a fulfillment system, a graphical user interface comprising management dashboard, the graphical user interface including a map region for viewing the UAV, the docking station, and the AGV.

5. The method of claim 4, wherein the graphical user interface further includes graphical elements embodying controls for one or more of:
   switching display of the map region between a two-dimensional map and three dimensional map;
   viewing all or select UAVs, docking stations, and AGVs associated with the fulfillment system;
   viewing all or select item transfer points between deployed UAVs, available docking stations, and available AGVs;
   viewing all or select delivery statuses of items being managed by the fulfillment system;
   modifying the flight path of the UAV;
   changing the delivery point to an alternative delivery point;
   changing the docking station to an alternative docking station;
   specifying a particular AGV to use for a particular item delivery; and
   managing a group of AGVs associated with a particular docking station.

6. The method of claim 1, further comprising:
   displaying, on a display of a display device, a graphical user interface requesting input providing a delivery point confirmation;
   receiving the input at a guidance engine; and
   determining, by the guidance engine, to change the delivery point based on the delivery point confirmation.

7. A method comprising:
   receiving a request to ship an item;
   loading the item via a handling mechanism of an unmanned aerial vehicle (UAV);

determining an item transfer point based on a delivery point, the item transfer point indicating a geographical location where the item is to be transferred from the UAV to one of a docking station and an autonomous ground vehicle (AGV) based on the delivery point;
calculating a flight path to the item transfer point;
deploying the UAV to the item transfer point using the flight path; and
transferring the item from the UAV to one of the docking station and the AGV, wherein transferring the item to one of the docking station and the AGV based on the delivery point includes:
selecting the AGV from a group of AGVs associated with the item transfer point based on one or more of: one or more item properties, one or more UAV attributes, one or more AGV attributes, and one or more delivery point characteristics;
coordinating a handoff of the item between the selected AGV and the UAV; and
transferring the item to a handling mechanism of the AGV using the handling mechanism of the UAV.

8. The method of claim 7, further comprising:
calculating a route for the AGV from the item transfer point to the delivery point;
navigating the AGV from the item transfer point to the delivery point; and
unloading the item from the AGV at the delivery point.

9. The method of claim 7, wherein selecting the AGV from the group of AGVs includes:
selecting the AGV based on an available payload capacity corresponding to one or more of a dimension and weight of the item, and an available deployment time corresponding to a targeted delivery time for delivering the item to the delivery point.

10. The method of claim 9, wherein selecting the AGV from the group of AGVs further includes matching a characteristic of the delivery point to a mechanical delivery capability of the AGV.

11. The method of claim 7, further comprising:
initially determining to transfer the item from the UAV to the AGV based on the delivery point;
receiving, during transit of the item by the UAV to the delivery point, a signal requesting a change to the delivery point; and
determining to transit the item to an alternative delivery point corresponding to the change using the AGV.

12. A system comprising:
a docking station remotely located from a fulfillment center;
a fulfillment system that manages the fulfillment center and the docking station, receives a request to ship an item, determines an item transfer point based on a delivery point, calculates a flight path to the item transfer point, initially determines to transfer the item from an unmanned aerial vehicle (UAV) to an autonomous ground vehicle (AGV) based on the delivery point, receives a signal requesting a change to the delivery point during transit of the item by the UAV to the delivery point, and determines to transfer the item from the UAV to the docking station instead of the AGV based on the change to the delivery point;
the UAV coupled for wireless communication with the fulfillment system and the docking station, the fulfillment system loading the item at the fulfillment center via a handling mechanism of the UAV and deploying the UAV to the item transfer point using the flight path; and the AGV coupled for wireless communication with the fulfillment system, the docking station, and the AGV, the item transfer point indicating a geographical location where the item is to be transferred from the UAV to one of the docking station and the AGV based on the delivery point.

13. The system of claim 12, wherein the fulfillment system further:
selects the AGV from a group of AGVs associated with the item transfer point based on one or more of: one or more item properties, one or more UAV attributes, one or more AGV attributes, and one or more delivery point characteristics;
coordinates a handoff of the item between the selected AGV and the UAV; and
transfers the item to a handling mechanism of the AGV using the handling mechanism of the UAV.

14. The system of claim 12, wherein:
the fulfillment system further calculates a route for the AGV from the item transfer point to the delivery point; and
the AGV navigates from the item transfer point to the delivery point and unloads the item at the delivery point.

15. The system of claim 12, wherein the fulfillment system selects the AGV from a group of AGVs based on an available payload capacity corresponding to one or more of a dimension and weight of the item, and an available deployment time corresponding to a targeted delivery time for delivering the item to the delivery point.

16. The system of claim 12, wherein the fulfillment system:
initially determines to transfer the item from the UAV to the AGV based on the delivery point;
receives, during transit of the item by the UAV to the delivery point, a signal requesting a change to the delivery point; and
determines to transit the item to an alternative delivery point corresponding to the change.

17. The system of claim 12, wherein:
the docking station includes a handling system having a port;
the fulfillment system:
determines to transfer the item from the UAV to a handling system of the docking station based on the delivery point; and
coordinates a handoff of the item between the port of the handling system of the docking station and the UAV; and
the handling mechanism transfers the item via the port of the handling system of the docking station.

18. A system comprising:
one or more processors;
one or more memories storing instructions that, when executed by the one or more processors, causes the system to perform operations comprising:
receiving a request to ship an item;
loading the item via a handling mechanism of an unmanned aerial vehicle (UAV);
determining an item transfer point based on a delivery point, the item transfer point indicating a geographical location where the item is to be transferred from the UAV to one of a docking station and an autonomous ground vehicle (AGV) based on the delivery point;
initially determining to transfer the item from the UAV to the AGV based on the delivery point;

calculating a flight path to the item transfer point;

deploying the UAV to the item transfer point using the flight path;

receiving, during transit of the item by the UAV to the delivery point, a signal requesting a change to the delivery point;

determining to transit the item to an alternative delivery point corresponding to the change using the AGV; and transferring the item from the UAV to one of the docking station and the AGV.

19. The system of claim 18, wherein the operations further comprise:

selecting the AGV from a group of AGVs associated with the item transfer point based on one or more of: one or more item properties, one or more UAV attributes, one or more AGV attributes, and one or more delivery point characteristics;

coordinating a handoff of the item between the selected AGV and the UAV; and transferring the item to a handling mechanism of the AGV using the handling mechanism of the UAV.

* * * * *